United States Patent
Oohira et al.

(10) Patent No.: US 12,363,592 B2
(45) Date of Patent: *Jul. 15, 2025

(54) CORE NODE, BASE STATION, RADIO TERMINAL, COMMUNICATION METHOD, RADIO RESOURCE ALLOCATION METHOD, BASE STATION SELECTION METHOD, AND READABLE MEDIUM

(71) Applicant: NEC Corporation, Tokyo (JP)

(72) Inventors: Mayo Oohira, Tokyo (JP); Masaaki Kosugi, Tokyo (JP); Toshiyuki Tamura, Tokyo (JP); Yusuke Takano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/315,140

(22) Filed: May 7, 2021

(65) Prior Publication Data

US 2021/0266793 A1 Aug. 26, 2021

Related U.S. Application Data

(63) Continuation of application No. 16/922,875, filed on Jul. 7, 2020, now Pat. No. 11,006,321, which is a
(Continued)

(30) Foreign Application Priority Data

Mar. 23, 2016 (JP) .................. 2016-058260

(51) Int. Cl.
*H04W 4/00* (2018.01)
*H04W 8/06* (2009.01)
(Continued)

(52) U.S. Cl.
CPC ............. *H04W 28/16* (2013.01); *H04W 8/06* (2013.01); *H04W 16/02* (2013.01); *H04W 48/18* (2013.01);
(Continued)

(58) Field of Classification Search
CPC ....... H04W 28/16; H04W 8/06; H04W 16/02; H04W 48/18; H04W 60/04; H04W 72/04; H04W 92/14; H04W 72/087
(Continued)

(56) References Cited

U.S. PATENT DOCUMENTS 8,391,244 B2 * 3/2013 Choi ................. H04W 36/0088
370/332
9,247,496 B2 * 1/2016 Khlat ........................ H03F 3/72
(Continued)

FOREIGN PATENT DOCUMENTS

CN    103650437 A    3/2014
CN    104639653 A    5/2015
(Continued)

OTHER PUBLICATIONS

Chinese Office Action for CN Application No. 201780018335.8 mailed on Apr. 22, 2022 with English Translation.
(Continued)

*Primary Examiner* — Amancio Gonzalez
(74) *Attorney, Agent, or Firm* — Dickinson Wright PLLC

(57) ABSTRACT

The present disclosure aims to provide a core node capable of appropriately allocating a radio resource of a RAN Slice allocated for a specific service to a radio terminal that uses this specific service. A core node (10) according to the present disclosure includes: a determination unit (14) configured to determine a radio resource to be allocated in accordance with a service provided for a radio terminal (30); and a communication unit (12) configured to transmit
(Continued)

resource identification information indicating the radio resource determined in the determination unit (14) to a base station (20) that manages a plurality of radio resources for each RAN Slice associated with a service.

6 Claims, 21 Drawing Sheets

Related U.S. Application Data continuation of application No. 16/520,448, filed on Jul. 24, 2019, now Pat. No. 10,791,482, which is a continuation of application No. 16/083,577, filed as application No. PCT/JP2017/006644 on Feb. 22, 2017, now Pat. No. 10,405,239.

(51) Int. Cl.
*H04W 16/02* (2009.01)
*H04W 28/16* (2009.01)
*H04W 48/18* (2009.01)
*H04W 60/04* (2009.01)
*H04W 72/04* (2023.01)
*H04W 92/14* (2009.01)

(52) U.S. Cl.
CPC ........... *H04W 60/04* (2013.01); *H04W 72/04* (2013.01); *H04W 92/14* (2013.01)

(58) Field of Classification Search
USPC ........................................................ 455/433
See application file for complete search history.

(56) References Cited

U.S. PATENT DOCUMENTS

| | | | | |
|---|---|---|---|---|
| 9,654,181 | B1* | 5/2017 | Wobak | H04B 5/24 |
| 9,775,045 | B2* | 9/2017 | Li | H04W 16/02 |
| 9,877,236 | B2* | 1/2018 | Bangolae | H04W 76/38 |
| 10,057,777 | B2* | 8/2018 | Li | H04W 16/02 |
| 10,313,887 | B2* | 6/2019 | Vrzic | H04W 16/02 |
| 10,368,340 | B2* | 7/2019 | Lu | H04N 21/4131 |
| 10,405,239 | B2* | 9/2019 | Oohira | H04W 8/06 |
| 10,517,123 | B2* | 12/2019 | Vikberg | H04W 76/10 |
| 10,536,946 | B2* | 1/2020 | Zhu | H04W 40/20 |
| 10,602,429 | B2* | 3/2020 | Wei | H04W 48/02 |
| 10,638,405 | B2* | 4/2020 | Myhre | H04W 16/00 |
| 10,644,955 | B2* | 5/2020 | Zhang | H04L 41/0897 |
| 10,772,101 | B2* | 9/2020 | Rong | H04W 72/12 |
| 10,791,482 | B2* | 9/2020 | Oohira | H04W 92/14 |
| 10,798,639 | B2* | 10/2020 | Chun | H04W 16/02 |
| 10,820,241 | B2* | 10/2020 | Zee | H04W 36/0027 |
| 10,863,560 | B2* | 12/2020 | Stille | H04W 76/11 |
| 10,932,253 | B2* | 2/2021 | Centonza | H04W 72/27 |
| 10,966,128 | B2* | 3/2021 | Zee | H04W 36/0077 |
| 10,979,955 | B2* | 4/2021 | Vrzic | H04W 36/26 |
| 10,993,172 | B2 | 4/2021 | Lee et al. | |
| 11,006,309 | B2* | 5/2021 | Keller | H04W 28/0252 |
| 11,012,928 | B2* | 5/2021 | Wang | H04W 48/18 |
| 11,076,344 | B1* | 7/2021 | Babaei | H04W 48/02 |
| 11,089,536 | B2* | 8/2021 | Wei | H04W 48/04 |
| 11,122,439 | B2* | 9/2021 | Wang | H04W 16/04 |
| 11,582,682 | B2* | 2/2023 | Wang | H04W 76/12 |
| 2011/0246758 | A1 | 10/2011 | Lu et al. | |
| 2013/0094486 | A1* | 4/2013 | Bhanage | H04W 88/08 370/338 |
| 2013/0125230 | A1* | 5/2013 | Koponen | H04L 41/0889 726/13 |
| 2014/0162628 | A1* | 6/2014 | Bevelacqua | H04B 17/15 455/423 |
| 2014/0162671 | A1 | 6/2014 | Kim et al. | |
| 2014/0219248 | A1 | 8/2014 | Reddiboyana et al. | |
| 2016/0262142 | A1 | 9/2016 | Nagata et al. | |
| 2017/0251353 | A1* | 8/2017 | Pinheiro | H04W 48/02 |
| 2018/0124854 | A1* | 5/2018 | Myhre | H04W 76/10 |
| 2018/0332632 | A1* | 11/2018 | Vikberg | H04W 76/10 |
| 2018/0359688 | A1* | 12/2018 | An | H04W 48/12 |
| 2018/0368140 | A1* | 12/2018 | Centonza | H04W 72/27 |
| 2018/0376364 | A1* | 12/2018 | Keller | H04W 28/0215 |
| 2019/0029075 | A1* | 1/2019 | Wang | H04L 63/0876 |
| 2021/0037456 | A1* | 2/2021 | Wang | H04W 48/18 |
| 2023/0281527 | A1* | 9/2023 | Cella | G06V 20/17 705/7.17 |

FOREIGN PATENT DOCUMENTS

| | | |
|---|---|---|
| EP | 3018957 A1 | 5/2016 |
| JP | 2014-045390 A | 3/2014 |
| JP | 2014-534745 A | 12/2014 |
| JP | 2015-012590 A | 1/2015 |
| JP | 2016-508296 A | 3/2016 |
| JP | 2016-517189 A | 6/2016 |
| WO | 2013/137461 A1 | 9/2013 |
| WO | 2014/023068 A1 | 2/2014 |
| WO | WO-2014/119701 A2 | 8/2014 |
| WO | 2014/136771 A1 | 9/2014 |
| WO | WO-2014/168225 A2 | 10/2014 |
| WO | WO-2015/002087 A1 | 1/2015 |
| WO | 2015/085273 A1 | 6/2015 |

OTHER PUBLICATIONS

China Mobile, "Solutions for Key Issue 1 (Support of Network Slicing)", 3GPP TSG-SA WG2 Meeting #113AH, S2-161081, Feb. 18, 2016.
CATT, "Smarter: Requirement of UE obtaining services from different network slices simultaneously", 3GPP TSG-SA WG1 Meeting #71, S1-152199, Aug. 7, 2015.
Indian Office Action for IN Application No. 202018055847 mailed on Feb. 22, 2022.
US Office Action for U.S. Appl. No. 17/470,974 mailed on Dec. 17, 2021.
Japanese Office Action for JP Application No. 2020-196741 mailed on Apr. 19, 2022 with English Translation.
Japanese Office Action for JP Application No. 2020-196741 mailed on Oct. 12, 2021 with English Translation.
3GPP "3rd Generation Partnership Project; Technical Specification Group Services and System Aspects; General Packet Radio Service (GPRS) Enhancements for Evolved Universal Terrestrial Radio Access Network (E-UTRAN) access (Release 13)", 3GPP TS 23.401 V13.6.0, (Mar. 2016), pp. 1-365 (365 pages).
3GPP "3rd Generation Partnership Project; Technical Specification Group Services and System Aspects; Study on Architecture for Next Generation System (Release 14)", 3GPP TR 23.799 V0.3.0, (Mar. 2016), pp. 1-52 (52 pages).
3rd Generation Partnership Project; Technical Specification Group Radio Access Network; Study on New Radio Access Technology; Radio Access Architecture and Interfaces (Release 14), 3GPP TR 38.801, V1.0.0, Dec. 8, 2016, 8. Realization of Network Slicing, (72 pages), Internet: <URL: http//www.3gpp.org/ftp/Specs/archive/38_series/38.801/38801-100.zip>.
Extended European Search Report issued in European Patent Application No. 17769781.0, dated Sep. 13, 2019, 5 pages.
Intel Corporation, Alcatel-Lucent, Nokia, China Unicom, ZTE Corporation, Use Case on Smarter Device Profile, 3GPP TSG-SA WG1 Meeting #71, S1-152399, Aug. 24, 2015, (3 pages), Internet <URL: http://www.3gpp,org/ftp/tsg/_sa/WG1_Serv/TSGS1_71_Belgrade/Docs/S1-152399.zip>.
International Search Report corresponding to PCT/JP2017/006644, dated May 16, 2017 (5 pages).
Japanese Notice of Reasons for Refusal issued in Japanese Patent Application No. 2018-507150, dated Jul. 7, 2020, 14 pages.
NGMN Alliance "NGMN 5G White Paper," version 1.0, Feb. 17, 2015, (124 pages).
NGMN Alliance, Liaison on NGMN 5G White Paper, 3GPP TSG RAN Meeting #68, RP-150542, Mamo, Sweden, Jun. 15-18, 2015 (3 pages), Internet: <URL:http://www.3gpp.org/ftp/tsg_ran/TSG_RAN/TSGR_68/Docs/RP-150542.zip>.

(56) References Cited

OTHER PUBLICATIONS

Technical Specification Group Services and System Aspects; "General Packet Radio Service (GPRS) Enhancements for Evolved Universal Terrestrial Radio Access Network (E-UTRAN) Access" (Release 13) 3GPP TS 23.401, V13.5.0 (Dec. 2015), (337 pages).
Technical Specification Group Services and System Aspects; "General Packet Radio Service (GPRS); Service Description; Stage 2" (Release 13), 3GPP TS 23.060, V13.5.0 (Dec. 2015), (362 pages).
Vision on 5G Radio Access Technologies, Huawei Technologies, 3GPP RAN workshop on 5G, Sep. 17-18, 2015, Phoenix, USA, RWS-150006, pp. 1-18.
JP Office Action for JP Application No. 2022-182199, mailed on Feb. 6, 2024 with English Translation.

* cited by examiner

CORE NODE, BASE STATION, RADIO TERMINAL, COMMUNICATION METHOD, RADIO RESOURCE ALLOCATION METHOD, BASE STATION SELECTION METHOD, AND READABLE MEDIUM

CROSS-REFERENCE TO RELATED APPLICATIONS

This patent application is a continuation of U.S. patent application Ser. No. 16/922,875 entitled "CORE NODE, BASE STATION, RADIO TERMINAL, COMMUNICATION METHOD, RADIO RESOURCE ALLOCATION METHOD, BASE STATION SELECTION METHOD, AND READABLE MEDIUM," filed Jul. 7, 2020, which is a continuation of U.S. patent application Ser. No. 16/520,448 entitled "CORE NODE, BASE STATION, RADIO TERMINAL, COMMUNICATION METHOD, RADIO RESOURCE ALLOCATION METHOD, BASE STATION SELECTION METHOD, AND READABLE MEDIUM," filed Jul. 24, 2019, now U.S. Pat. No. 10,791,482, which is a continuation of of U.S. patent application Ser. No. 16/083,577 entitled "CORE NODE, BASE STATION, RADIO TERMINAL, COMMUNICATION METHOD, RADIO RESOURCE ALLOCATION METHOD, BASE STATION SELECTION METHOD, AND READABLE MEDIUM," filed Sep. 10, 2018, now U.S. Pat. No. 10,405,329, which claims the benefit of the priority of national stage application of International Application No. PCT/JP2017/006644 entitled "CORE NODE, BASE STATION, RADIO TERMINAL, COMMUNICATION METHOD, RADIO RESOURCE ALLOCATION METHOD, BASE STATION SELECTION METHOD, AND READABLE MEDIUM," filed on Feb. 22, 2017, which claims the benefit of the priority to Japanese Patent Application No. 2016-058260, filed on Mar. 23, 2016, the disclosures of each of the above are hereby incorporated by reference in their entirety.

TECHNICAL-FIELD

The present disclosure relates to a core node, a base station, a radio terminal, a communication method, a radio resource allocation method, a base station selection method, and a program, and more specifically, to a core node, a base station, a radio terminal, a communication method, a radio resource allocation method, a base station selection method, and a program for performing allocation of radio resources.

BACKGROUND ART

In recent years, discussions on Internet Of Things (IoT) services have been conducted. In the IoT services, a large number of terminals that autonomously execute communications (each of these terminals will be referred to as an IoT terminal) without requiring any user's operation have been used. Therefore, in order to provide the IoT services using a large number of IoT terminals, it has been desired to efficiently accommodate a large number of IoT terminals in a network that a communication provider or the like manages.

Non-Patent Literature 1 discloses, in page 11, a method of managing radio resources to be allocated to terminals. Specifically, this literature discloses that a radio resource group including a plurality of radio resources is divided into a plurality of Radio Access Network (RAN) Slices and each of the RAN Slices is allocated to a specific service. That is, the radio resources included in a predetermined RAN Slice are allocated to the radio terminal used for a specific service. As described above, by allocating the RAN Slice for each service, it is possible to prevent radio resources from not being allocated to other services when the number of radio terminals used for a specific service has increased.

CITATION LIST

Non-Patent Literature

[Non-Patent Literature 1] Vision on 5G Radio Access Technologies, Huawei Technologies, 3GPP RAN workshop on 5(G Sept.17-18, 2015, Phoenix, USA, RWS-150006

SUMMARY OF INVENTION

Technical Problem

However, while dividing a radio resource group into a plurality of RAN Slices and managing the plurality of RAN Slices are disclosed in Non-Patent Literature 1, this literature does not disclose how to allocate radio resources to the radio terminal. That is, a method of allocating the radio resources to the radio terminal used for a specific service has not yet been established. The method of allocating the radio resources is the method of allocating the radio resources of the RAN Slice allocated for a specific service to the radio terminal. Therefore, there is a problem that it is impossible to allocate the radio resources of the RAN Slice that are managed in a divided manner to an appropriate radio terminal.

The present disclosure aims to provide a core node, a base station, a radio terminal, a communication method, a radio resource allocation method, a base station selection method, and a program capable of appropriately allocating radio resources of a RAN Slice allocated for each service to the radio terminal that uses this service.

Solution to Problem

A core node according to a first aspect of the present disclosure includes: a determination unit configured to determine a radio resource to be allocated in accordance with a service provided for a radio terminal; and a communication unit configured to transmit resource identification information indicating the radio resource determined in the determination unit to a base station that manages a plurality of radio resources for each RAN Slice associated with a service.

A base station according to a second aspect of the present disclosure includes: a management unit configured to manage a plurality of radio resources for each RAN Slice associated with a service; a communication unit configured to receive resource identification information that has been transmitted from a core node and indicates a radio resource to be allocated in accordance with a service provided for a radio terminal; and a resource allocation unit configured to allocate the radio resource indicated by the resource identification information to the radio terminal.

A radio terminal according to a third aspect of the present disclosure includes: a receiver configured to receive broadcast information items transmitted from a plurality of respective base stations; and a determination unit configured to determine that the radio terminal should be connected to a base station among the plurality of base stations that has transmitted broadcast information including RAN Slice identification information indicating a RAN Slice that provides a service that the radio terminal uses.

A communication method according to a fourth aspect of the present disclosure includes: determining a radio resource to be allocated in accordance with a service to be provided for a radio terminal; and transmitting resource identification information indicating the radio resource that has been determined to a base station that manages a plurality of radio resources for each RAN Slice associated with a service.

A radio resource allocation method according to a fifth aspect of the present disclosure includes: managing a plurality of radio resources for each RAN Slice associated with a service; receiving resource identification information that has been transmitted from a core node and indicates a radio resource to be allocated in accordance with a service provided for a radio terminal; and allocating the radio resource indicated by the resource identification information to the radio terminal.

A base station selection method according to a sixth aspect of the present disclosure includes: receiving broadcast information items transmitted from a plurality of respective base stations; and determining that a connection should be established with a base station among the plurality of base stations that has transmitted broadcast information including RAN Slice identification information indicating a RAN Slice that provides a service to be used.

A program according to a seventh aspect of the present disclosure causes a computer to execute the following processing of: determining a radio resource to be allocated in accordance with a service to be provided for a radio terminal; and transmitting resource identification information indicating the radio resource that has been determined to a base station that manages a plurality of radio resources for each RAN Slice associated with a service.

Advantageous Effects of Invention

According to the present disclosure, it is possible to provide a core node, a base station, a radio terminal, a communication method, a radio resource allocation method, a base station selection method, and a program capable of appropriately allocating radio resources of a RAN Slice allocated for each service to the radio terminal that uses this service.

DESCRIPTION OF EMBODIMENTS

First Embodiment

Figure 1:
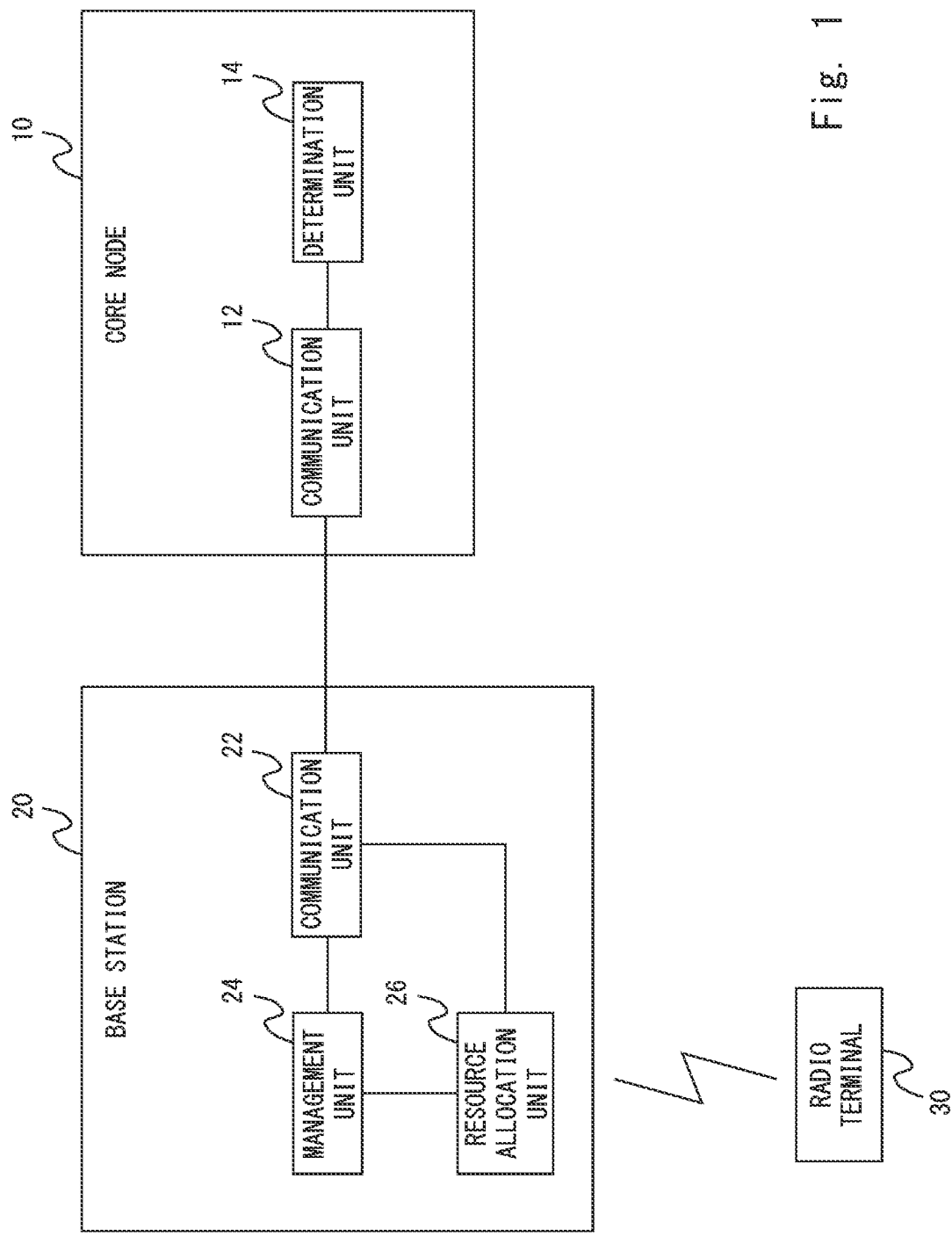
FIG. 1 is a configuration diagram of a communication system according to a first embodiment.

Hereinafter, with reference to the drawings, embodiments of the present disclosure will be explained. With reference to FIG. 1, a configuration example of a communication system according to a first embodiment of the present disclosure will be explained. FIG. 1 includes a core node 10, a base station 20, and a radio terminal 30. The core node 10, the base station 20, and the radio terminal 30 may each be a computer apparatus operated by a processor executing a program stored in a memory.

The core node 10 may be a Mobility Management Entity (MME), a Serving General Packet Radio Service Support Node (SGSN) or the like each defined to be a node that performs session management and mobility management in the 3rd Generation Partnership Project (3GPP). The base station 20 may be an evolved Node B (eNodeB) that is defined in the 3GPP. The eNodeB is a base station that supports Long Term Evolution (LTE) as a radio communication system. Further, the base station 20 may be replaced by a Radio Network Controller (RNC) and a NodeB defined to be an apparatus for controlling the base station in the 3GPP.

The radio terminal 30 may be a mobile phone terminal, a smartphone terminal a tablet terminal or the like. Alternatively, the radio terminal 30 may be an IoT terminal, a Machine Type Communication (MTC) terminal, a Machine to Machine (M2M) terminal or the like.

Next, a configuration example of the core node 10 will be explained. The core node 10 includes a communication unit 12 and a determination unit 14. The components that compose the core node 10 such as the communication unit 12 and the determination unit 14 may be software or a module whose processing is executed by the processor executing the program stored in the memory. Alternatively, the components that form the core node 10 may be hardware such as a circuit or a chip. Further, the communication unit 12 includes a transmitter and a receiver.

The determination unit 14 determines radio resources to be allocated to the radio terminal 30 using service information indicating the service to be provided for the radio terminal 30. The radio resources may be, for example, resources managed by the base station 20. The radio resources may be resources defined using at least one of a frequency and time.

The service to be provided for the radio terminal 30 may be, for example, a voice service for providing a voice call, a data service for transmitting image data, text data or the like, a simultaneous distribution service for concurrently distributing data or the like. Alternatively, the service to be provided for the radio terminal 30 may be an IoT service. The IoT service may be, for example, a service that uses a smart meter, an automatic driving service or the like. The services stated as the service to be provided for the radio terminal 30 are not limited to the aforementioned services and various kinds of services may be provided for the radio terminal 30. The service information is information for identifying the service to be provided for the radio terminal 30.

The communication unit 12 transmits resource identification information indicating the radio resources determined in the determination unit 14 to the base station 20 that divides the radio resource group including the plurality of radio resources into a plurality of RAN Slices and manages the plurality of RAN Slices. Each of the RAN Slices includes some radio resources included in the radio resource group. Each of the RAN Slices includes at least one radio resource. One radio resource may be, for example, a resource that is specified using a specific frequency band and a specified period. It can also be said that the RAN Slice includes an area in which a plurality of radio resources are combined with each other. Further, it can be said that the RAN Slice includes at least some of the radio resource groups managed by the base station 20. The RAN Slice is associated with the service provided for the radio terminal. That is, the RAN Slice includes at least one radio resource to be allocated to the radio terminal that uses the specific service.

The resource identification information, which is information for identifying the radio resources managed by the base station 20, is information for identifying at least one radio resource. Further, the communication unit 12 transits resource identification information indicating the radio resources included in the RAN Slice associated with the service to be provided for the radio terminal 30 to the base station 20.

Next, a configuration example of the base station 20 will be explained. The base station 20 includes a communication unit 22, a management unit 24, and a resource allocation unit 26. The components such as the communication unit 22, the management unit 24, and the resource allocation unit 26 that compose the base station 20 may be software or a module whose processing is executed by the processor executing the program stored in the memory. Alternatively, the components that compose the base station 20 may be hardware such as a circuit or a chip. Further, the communication unit 22 includes a transmitter and a receiver.

The management unit 24 divides a radio resource group including the plurality of radio resources into a plurality of RAN Slices and manages the plurality of RAN Slices. The communication unit 22 receives the resource identification information that has been transmitted from the core node 10 and indicates the radio resources to be allocated to the radio terminal 30. The resource identification information indicates the radio resources included in the RAN Slice associated with the service to be provided for the radio terminal 30.

The resource allocation unit 26 allocates the radio resources indicated in the resource identification information to the radio terminal 30.

As described above, by using the communication system shown in FIG. 1, the core node 10 is able to transmit the resource identification information indicating the radio resource to be allocated to the radio terminal 30 to the base station 20 that divides the radio resource group into a plurality of RAN Slices and manages the plurality of RAN Slices. Therefore, the base station 20 is able to allocate the radio resources specified by the core node 10 to the radio terminal 30. The core node 10 is able to determine the radio resources to be allocated to the radio terminal 30 based on the service used by the radio terminal 30. Therefore, the base station 20 is able to appropriately allocate the radio resources included in the RAN Slice associated with the service used by the radio terminal 30 to the radio terminal 30.

Second Embodiment

Figure 2:
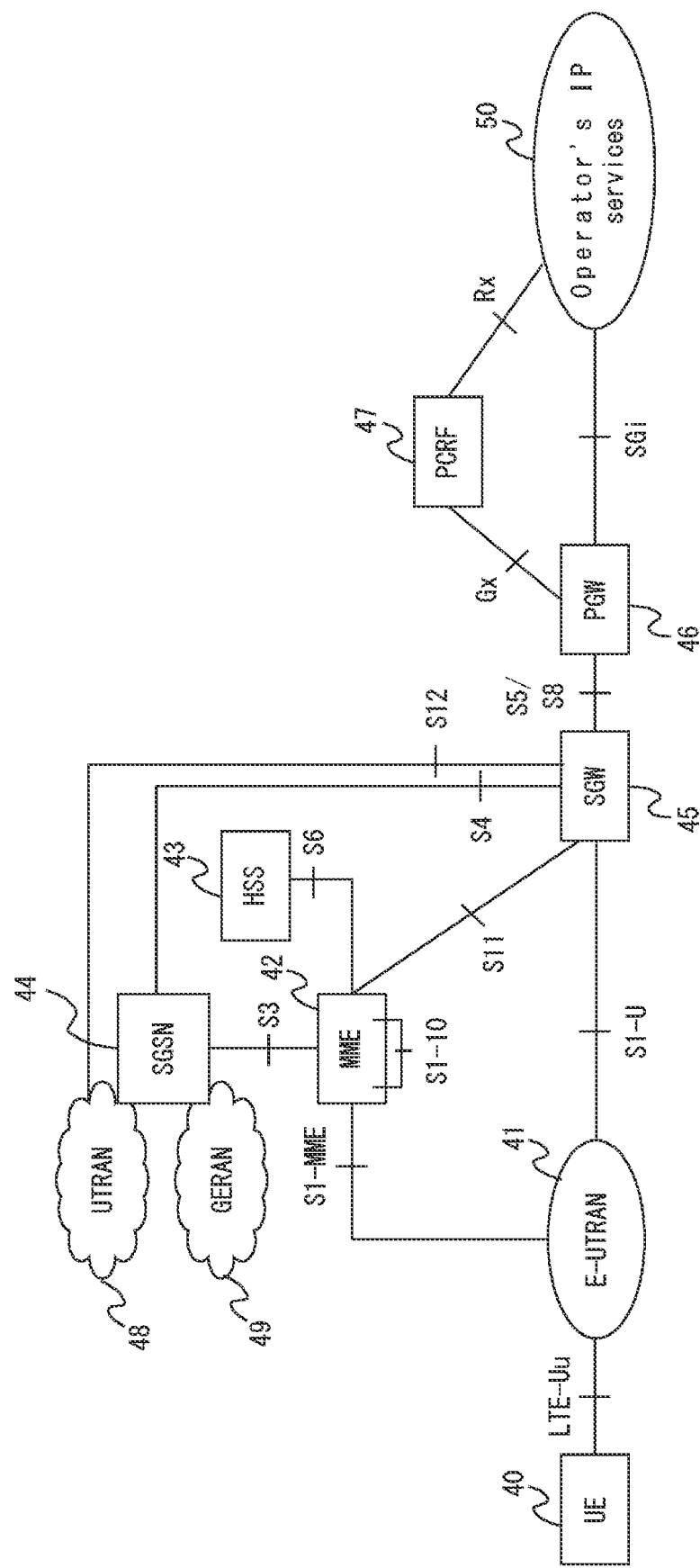
FIG. 2 is a configuration diagram of a communication system according to a second embodiment.

Referring next to FIG. 2, a configuration example of a communication system according to a second embodiment of the present disclosure will be explained. The communication system shown in FIG. 2 is a communication system that supports LTE as a radio communication system, and is a communication system defined to be an Evolved Packet System (EPS) in the 3GPP. FIG. 2 is based on the drawing in TS 23.401 V 13.5.0 FIG. 4.2.1-1.

The communication system shown in FIG. 2 includes a User Equipment (UE) 40, an Evolved-Universal Mobile Telecommunications System Terrestrial Radio Access Network (E-UTRAN) 41, an MME 42, a Home Subscriber Server (HSS) 43, an SGSN 44, a Serving Gateway (SGW) 45, a Packet Data Network Gateway (PGW) 46, a Policy and Charging Rules Function (PCRF) entity 47 (hereinafter it will be referred to as a PCRF 47), a UTRAN 48, a Global System for Mobile communications (GSM) (trademark) Enhanced Data Rates for Global Evolution (EDGE) Radio Access Network (GERAN) 49, and an Operator's IP Services 50.

The UE 40 is used as a general term for the radio terminal in the 3GPP. The UE may be replaced by, for example, a Mobile Station (MS). The E-UTRAN 41 is a Radio Access Network (RAN) that uses LTE as a radio access system. The UTRAN 48 is a RAN that uses a 3G wireless system as a radio access system. The GERAN 49 is a RAN that uses a 2G wireless system as a radio access system.

Each of the MME 42 and the SGSN 44 is a node that executes mobility management, session management and the like regarding the UE 40. The HSS 43 is a node that manages subscriber information regarding the UE 40. The subscriber information includes information regarding the service that the UE 40 uses. The SGW 45 and the PGW 46 are nodes that relay data transmitted between the UE 40 and the Operator's IP Services 50. The Operator's IP Services 50 may be, for example, a server apparatus or server apparatuses managed by a provider or the like that provides a service for the UE 40. The PCRF 47 is a node that manages policy and charging rules and the like.

An LTE-Uu reference point is defined between the UE 40 and the E-UTRAN 41. An S1-MME reference point is defined between the E-UTRAN 41 and the MME 42. An S6 reference point is defined between the MME 42 and the HSS 43. An S3 reference point is defined between the MME 42 and the SGSN 44. An S1-U reference point is defined between the E-UTRAN 41 and the SGW 45. An S11 reference point is defined between the MME 42 and the SGW 45. An S4 reference point is defined between the SGSN 44 and the SGW 45. An S12 reference point is defined between the SGW 45 and the UTRAN 48. An S5/S8 reference point is defined between the SGW 45 and the PGW 46. A Gx reference point is defined between the PGW 46 and the PCRF 47. An SGi reference point is defined between the PGW 46 and the Operator's IP Services 50. An Rx reference point is defined between the PCRF 47 and the Operator's IP Services 50. An S1-10 reference point is defined between the MME 42 and another MME.

Figure 3:
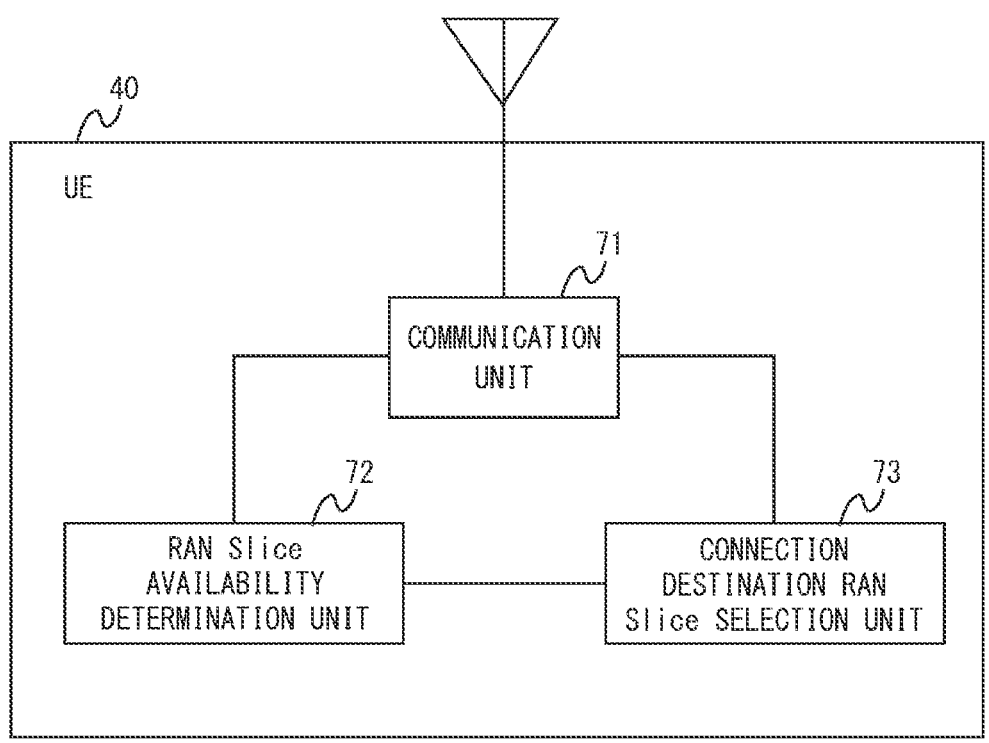
FIG. 3 is a configuration diagram of a LIE according to the second embodiment.

Referring next to FIG. 3, a configuration example of the UE 40 will be explained. The UE 40 includes a communication unit 71, a RAN Slice availability determination unit 72, and a connection destination RAN Slice selection unit 73. The components that form the UE 40 may be software or a module whose processing is executed by the processor executing the program stored in the memory. Alternatively, the components that form the UE 40 may be hardware such as a circuit, a chip or the like.

The communication unit 71 performs radio communication with the eNodeB included in the E-UTRAN 41 using LTE. Further, the communication unit 71 receives broadcast information transmitted from the eNodeB. The communication unit 71 may receive broadcast information from a plurality of eNodeBs. The broadcast information is transmitted using, for example, a Broadcast Control Channel (BCCH). The broadcast information includes at least one RAN Slice 1D. The RAN Slice ID is information for identifying the RAN Slice managed by the eNodeB. Further, the RAN Slice is a radio resource that is used to provide a specific service. That is, the UE 40 is able to recognize the service that the eNodeB can provide by receiving the broadcast information. The communication unit 71 outputs the RAN Slice ID included in the broadcast information to the RAN Slice availability determination unit 72.

The RAN Slice availability determination unit 72 determines whether there is a RAN Slice associated with a service that the UE 40 uses in the RAN Slice ID output from the communication unit 71. It is assumed that the RAN Slice availability determination unit 72 stores at least one RAN Slice ID indicating the RAN Slice associated with the service that the UE 40 uses in advance. The RAN Slice availability determination unit 72 determines whether the RAN Slice ID that is stored in advance is included in the RAN Slice ID output from the communication unit 71. The RAN Slice availability determination unit 72 outputs the RAN Slice ID that coincides with the RAN Slice ID that is stored in advance from among the RAN Slice IDs output from the communication unit 71 to the connection destination RAN Slice selection unit 73.

When the connection destination RAN Slice selection unit 73 has received a plurality of RAN Slice IDs from the RAN Slice availability determination unit 72, the connection destination RAN Slice selection unit 73 selects, based on the predetermined policy, the RAN Slice to be used. The connection destination RAN Slice selection unit 73 may select, for example, the RAN Slice ID that has been transmitted from the eNodeB whose radio field intensity is the strongest. Alternatively, the connection destination RAN Slice selection unit 73 may set priorities for the respective RAN Slice IDs and select the RAN Slice ID whose priority is the highest. The connection destination RAN Slice selection unit 73 outputs the RAN Slice ID that has been selected to the communication unit 71. Alternatively, the connection destination RAN Slice selection unit 73 may select the RAN Slice ID regarding the specific service to be preferentially used. The specific service is, for example, an IoT service, an automatic driving service or the like.

The communication unit 71 executes connection processing with the eNodeB including the RAN Slice ID output from the connection destination RAN Slice selection unit 73.

Figure 4:
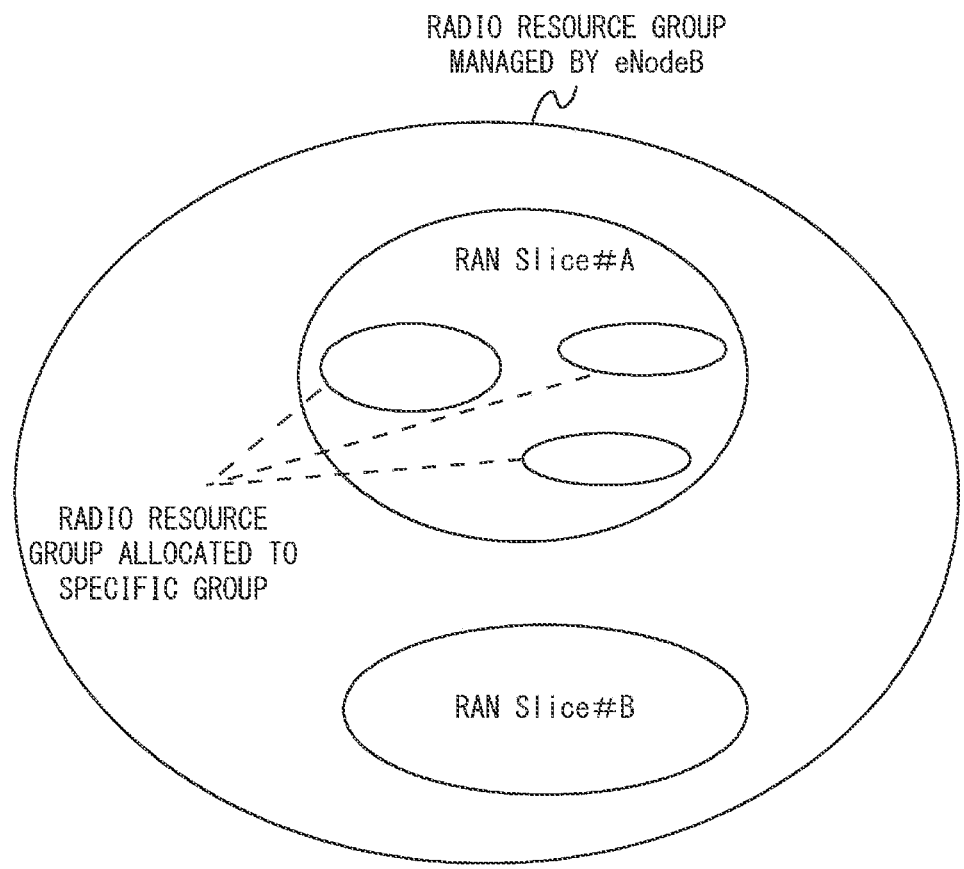
FIG. 4 is a configuration diagram of radio resource managed by an eNodeB according to the second embodiment.

Referring next to FIG. 4, a configuration example of the radio resources managed by the eNodeB included in the E-UTRAN 41 according to the second embodiment of the present disclosure will be explained. FIG. 4 shows that the eNodeB manages a radio resource group including a plurality of radio resources. FIG. 4 further shows that the eNodeB divides the radio resource group into a RAN Slice #A and a RAN Slice MB and manages these RAN Slices. FIG. 4 further shows that the RAN Slice #A is formed of a plurality of radio resource groups to be allocated to a specific group. The specific group may be, for example, a group that uses the service associated with the RAN Slice A. The specific group may include a plurality of UEs that use the service associated with the RAN Slice PA. The RAN Slice PA may be, for example, a RAN Slice for automatic driving. Further, the specific group may be an automatic driving apparatus provided by each company. Radio resources included in the radio resource group allocated to the group to which the IE belongs are allocated to the UE The radio resources to be allocated to the UE are identified by, for example, a Resource ID.

Figure 5:
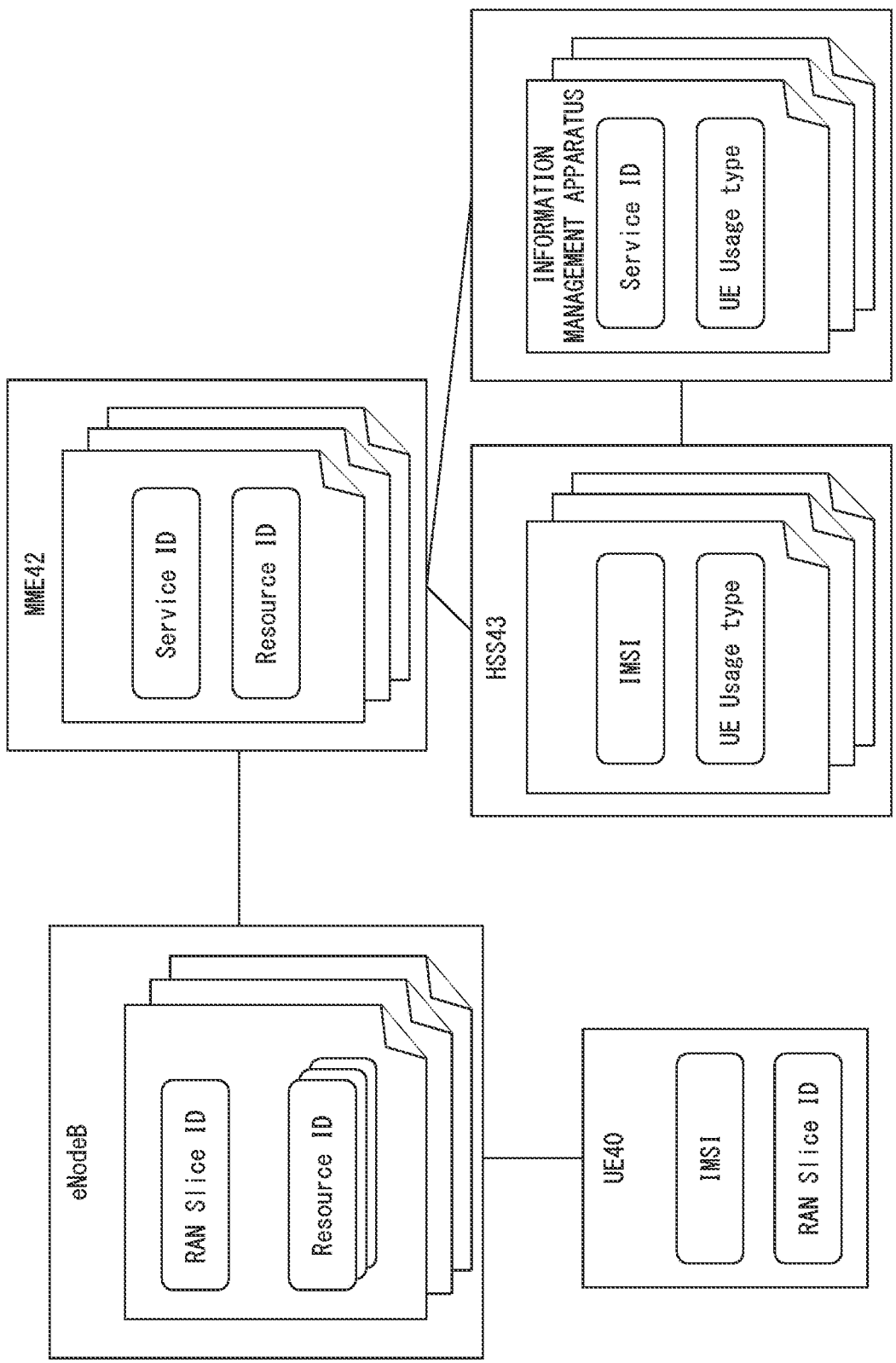
FIG. 5 is a diagram showing information managed by each node apparatus according to the second embodiment.

Referring next to FIG. 5, information included in the UE 40, the eNodeB, the MME 42, the HSS 43, and the information management apparatus will be explained. The information management apparatus, which is an apparatus different from the HSS 43, manages subscriber information. While the HSS 43 and the information management apparatus are shown to be apparatuses different from each other in FIG. 5, the HSS 43 and the information management apparatus may be the same apparatus. In other words, the HSS 43 may include the function of the information management apparatus.

The UE 40 includes an Internal Mobile Subscriber Identity (IMSI) and a RAN Slice ID. The IMSI is information for identifying the UE. The RAN Slice ID is information indicating the RAN Slice associated with a service that the UE 40 uses.

The eNodeB manages the RAN Slice ID and the Resource ID in association with each other. The RAN Slice ID is information for identifying the RAN Slice managed by the eNodeB. The Resource ID is information for identifying the radio resources to be allocated to the UE 40. The Resource ID is information uniquely identified in the eNodeB. One RAN Slice ID and a plurality of Resource IDs are associated with each other. Further, when the eNodeB manages a plurality of RAN Slices, it includes a plurality of RAN Slice IDs.

The HSS 43 manages the IMSI and the UE Usage type in association with each other. The UE Usage type is information for identifying the service that the UE identified by the IMSI uses or the group to which the UE belongs. The HSS 43 manages the IMSI and the UE Usage type regarding the plurality of UEs.

The information management apparatus manages the Service ID and the UE Usage type in association with each other. The Service ID is information for identifying the service that the UE uses and the group to which the UE belongs. It is assumed that the Service TD is information uniquely identified in the communication system. The information management apparatus manages the Service ID and the UE Usage type regarding a plurality of UEs. When the HSS 43 and the information management apparatus are the same apparatus, the HSS 43 manages the IMSI, the UE Usage type, and the Service ID in association with one another. The service that the UE uses is specified using the Service ID. Further, the Service ID is specified using the UE Usage type. The Service ID may be specified using subscriber information other than the UE Usage type.

The MME 42 manages the Service ID and the Resource ID in association with each other. That is, the MME 42 is able to specify the Resource ID to be allocated to the IE in the eNodeB using the Service ID.

While the eNodeB manages the radio resources using the Resource ID uniquely identified in the eNodeB in FIG. 5, the eNodeB may manage the radio resources using the Service ID uniquely identified in the communication system. In this case, the MME 42 needs not manage the Service ID and the Resource ID and is able to send an instruction regarding the radio resources to be allocated to the UE to the eNodeB using the Service ID.

Figure 6:
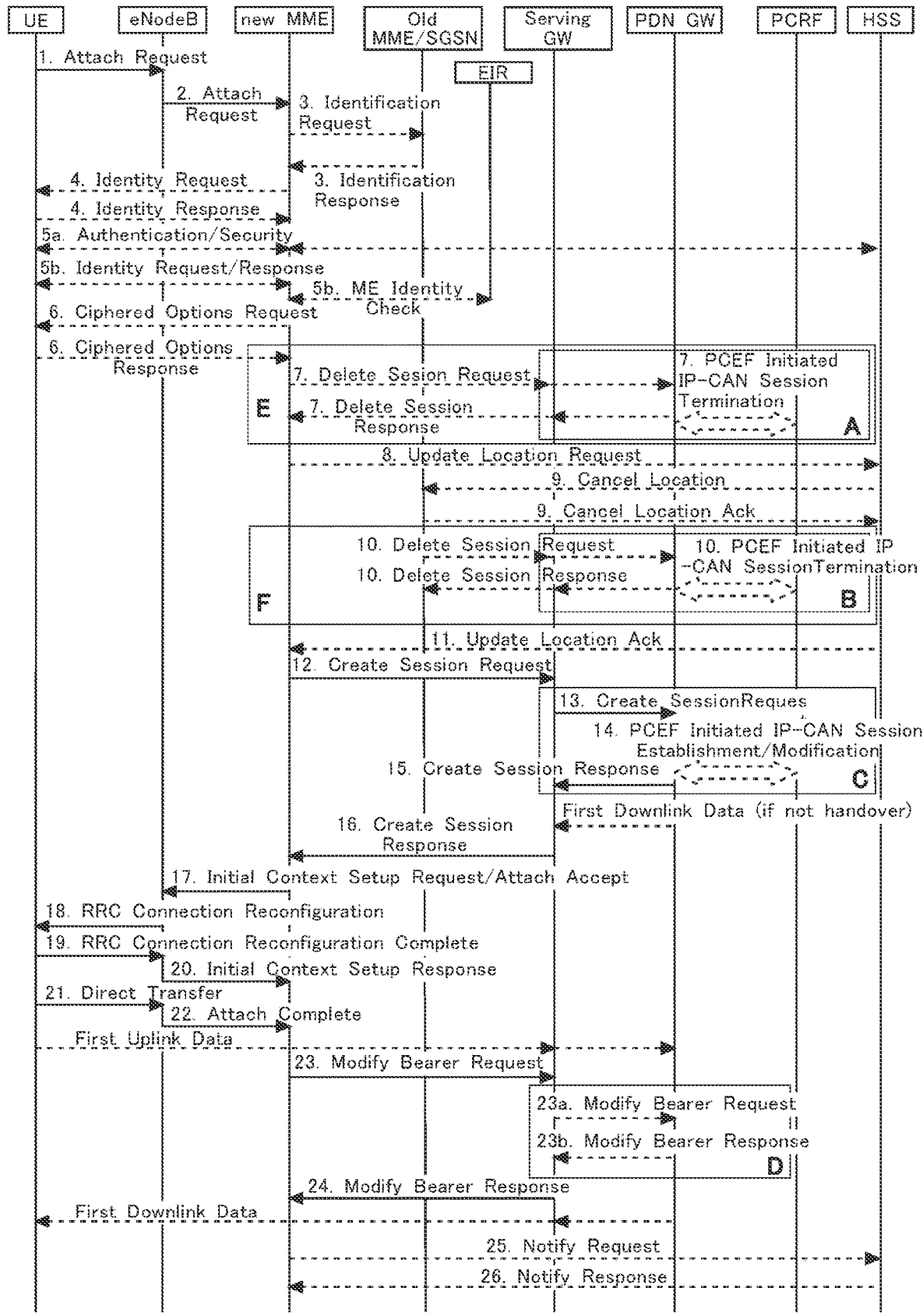
FIG. 6 is a diagram showing a flow of an Attach procedure according to the second embodiment.

Referring next to FIG. 6, a flow of the Attach procedure according to the second embodiment of the present disclosure will be explained. FIG. 6 shows a flow of processing when the Attach procedure is normally completed in the communication system shown in FIG. 2. The Attach procedure shown in FIG. 6 is based on TS23.401 V13.5.0 (2015-12) FIG. 5.3.2.1-1: Attach procedure. In the Attach procedure shown in FIG. 6, regarding processing similar to that in TS23.401 V13.5.0 (2015-12) FIG. 5.3.2.1-1: Attach procedure, detailed descriptions thereof will be omitted.

Further, the UE shown in FIG. 6 corresponds to the UE 40 shown in FIG. 2 and the eNodeB shown in FIG. 6 corresponds to the eNodeB included in the E-UTRAN 41 shown in FIG. 2. The new MME shown in FIG. 6 corresponds to the MME 42 shown in FIG. 2. The Old MME/SGSN shown in FIG. 6 is the MME/SGSN that has been allocated to the UE 40 in the previous Attach. In the Attach procedure shown in FIG. 6, an operation of a case in which an MME (new MME) other than the MME/SGSN (Old MME/SGSN) allocated in the previous Attach is allocated due to, for example, a movement of the UE 40, will be explained. The Serving GW shown in FIG. 6 corresponds to the SGW 45 shown in FIG. 2. The PDN GW shown in FIG. 6 corresponds to the PGW 46 shown in FIG. 2. The PCRF shown in FIG. 6 corresponds to the PCRF 47 shown in FIG. 2. The HSS shown in FIG. 6 corresponds to the HSS 43 shown in FIG. 2. Further, the Equipment Identity Register (EIR) shown in FIG. 6 is a node that manages identification information (e.g., a Mobile Equipment (ME) Identity) of the UE, although it is not shown in FIG. 2.

Since FIG. 6, 1 to FIG. 6, 7 are similar to the processing shown in TS23.401 V13.5.0 (2015-12) FIG. 5.3.2.1-1: Attach procedure, detailed descriptions thereof will be omitted. In the processing of FIG. 6, 1 to FIG. 6, 7, authentication processing regarding the UE is mainly executed.

Figure 9:
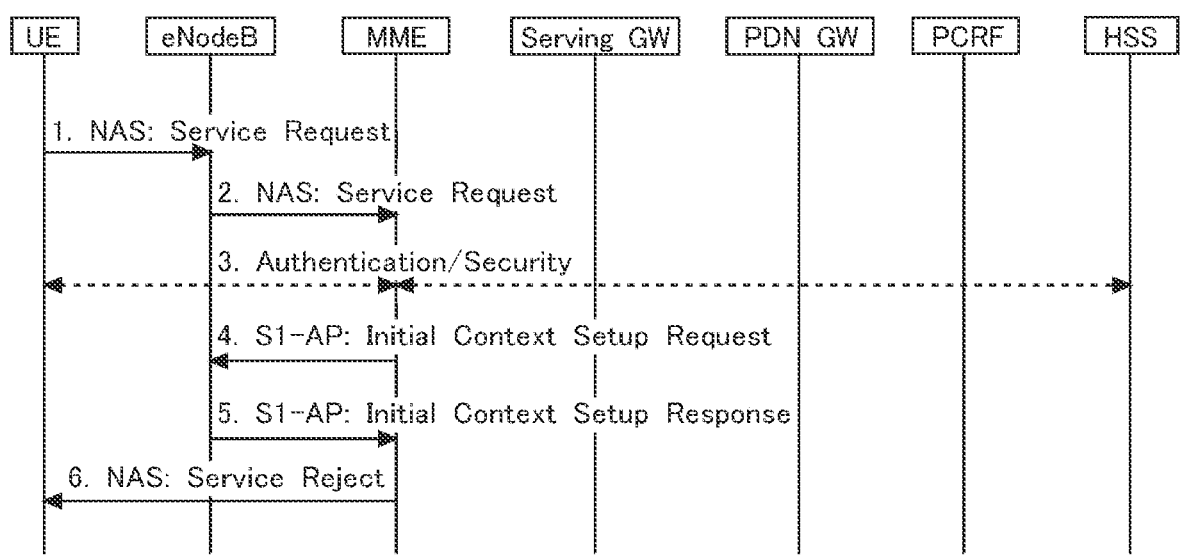
FIG. 9 is a diagram showing a flow of the UE triggered Service Request procedure according to the second embodiment.
Figure 10:
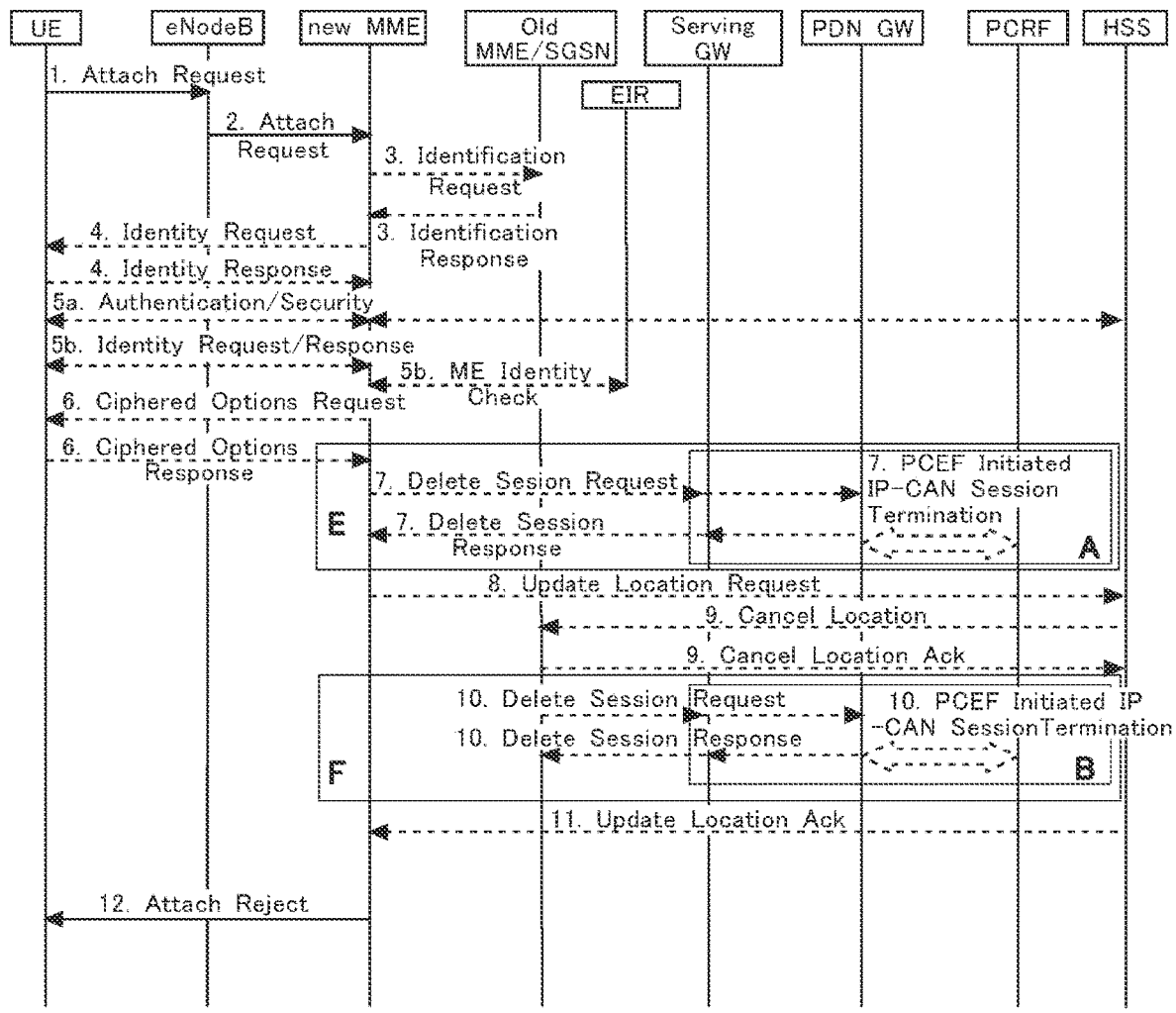
FIG. 10 is a diagram showing a flow of an Attach procedure according to a third embodiment.

When the processing of FIG. 6, 1 to FIG. 6, 7 is completed, the new MME; transmits an Update Location Request message to the HSS (FIG. 6, 8). The Update Location Request message includes the IMSI of the UE. Since FIG. 6, 9 and FIG. 6, 10 are similar to the processing shown in TS23.401 V13.5.0 (2015-12) FIG. 5.3.2.1-1: Attach procedure, detailed descriptions thereof will be omitted. In the processing of FIG. 6, 9 and FIG. 6, 10, processing for deleting information regarding the UE managed in the Old MME/SGSN is mainly executed.

When the HSS acquires the IMSI of the UE in FIG. 6, 8, the HSS specifies the UE Usage type associated with the acquired IMSI. Further, the HSS acquires the Service ID associated with the specified UE Usage type from the information management apparatus. When the HSS and the information management apparatus are the same apparatus, the HSS further specifies the Service ID associated with the specified UE Usage type using the specified UE Usage type.

The HSS transmits an Update Location Ack message to the new MME (FIG. 6, 11). The Update Location Ack message includes a Service ID.

Figure 12:
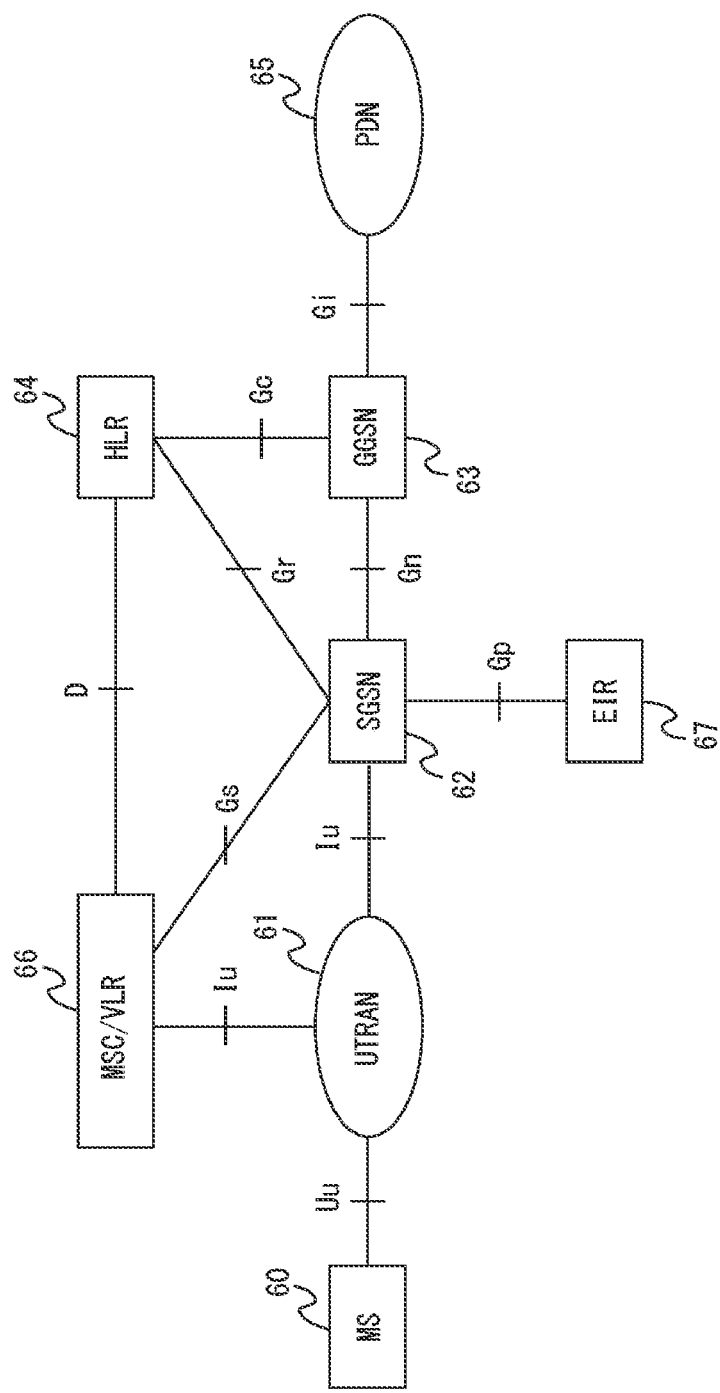
FIG. 12 is a configuration diagram of a communication system according to a fourth embodiment.
Figure 16:
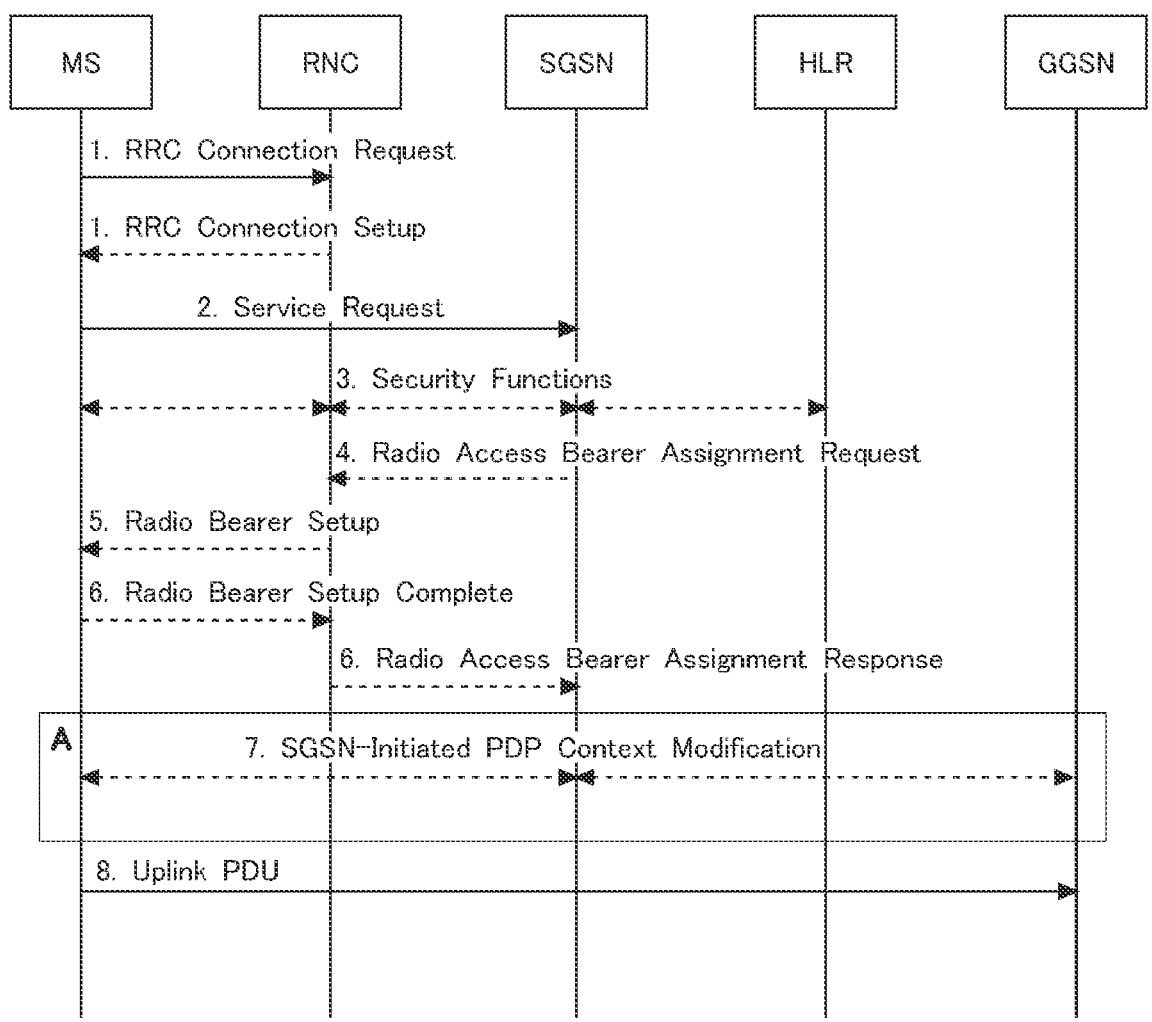
FIG. 16 is a diagram showing a flow of an MS Initiated Service Request Procedure using GN/Gp according to the fourth embodiment.

Since FIG. 6, 12 to FIG. 6, 16 are similar to the processing shown in TS23.401 V13.5.0 (2015-12) FIG. 5.3.2.1-1: Attach procedure, detailed descriptions thereof will be omitted. In FIG. 6, 12 to FIG. 6, 16, processing for establishing the session and the bearer that the UE uses between the Serving GW and the PDN GW is mainly executed.

When the new MME acquires the Service ID that identifies the service that the UE uses and the group to which the UE belongs in FIG. 6, 11, the new MME specifies the Resource ID that specifies the radio resource to be allocated to the UE in the eNodeB. The Resource ID is associated with the Service ID. When the new MME specifies the Resource ID, the new MME transmits an Initial Context Setup Request message to the eNodeB (FIG. 6, 17). The Initial Context Setup Request message includes a Resource ID.

Next, the eNodeB determines whether it is possible to allocate, to the UE, the radio resources indicated by the Resource ID transmitted from the new MME. When, for example, the radio resources indicated by the Resource ID are not allocated to another UE, the eNodeB may be able to determine that it is possible to allocate the radio resources indicated by the Resource ID transmitted from the new MME. When the eNodeB determines that it is possible to allocate the radio resources indicated by the Resource ID transmitted from the new MME to the UE, the eNodeB transmits an RRC Connection Reconfiguration message to the UE (FIG. 6, 18). The RRC Connection Reconfiguration message includes information for specifying the radio resources indicated by the Resource ID transmitted from the new MME. The information for specifying the radio resources may be, for example, identification information of a frequency and a time slot indicating the radio resources. Therefore, the UE is notified that the UE is allowed to allocate the radio resource included in the RAN Slice regarding the service thereto.

Figure 19:
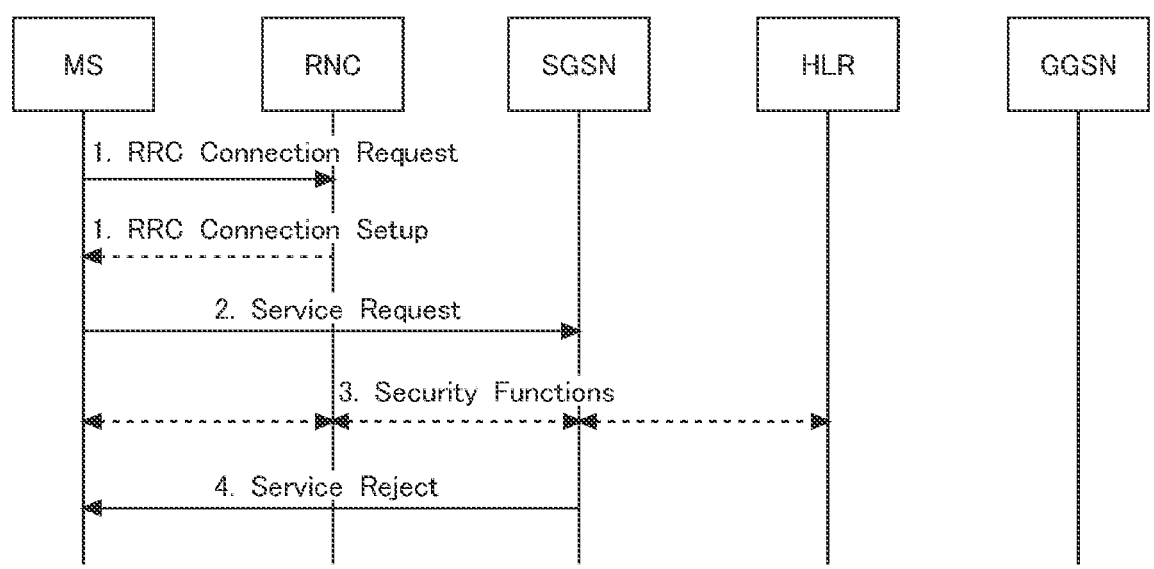
FIG. 19 is a diagram showing a flow of an MS Initiated Service Request Procedure using GN/Gp according to the fifth embodiment.

Since FIG. 6, 19 to FIG. 6, 26 are similar to the processing shown in TS23.401 V13.5.0 (2015-12) FIG. 5.3.2.1-1: Attach procedure, detailed descriptions thereof will be omitted. In FIG. 6, 19 to FIG. 6, 26, processing for notifying the Serving GW of information regarding the radio bearer established between the UE and the eNodeB is mainly executed.

Figure 7:
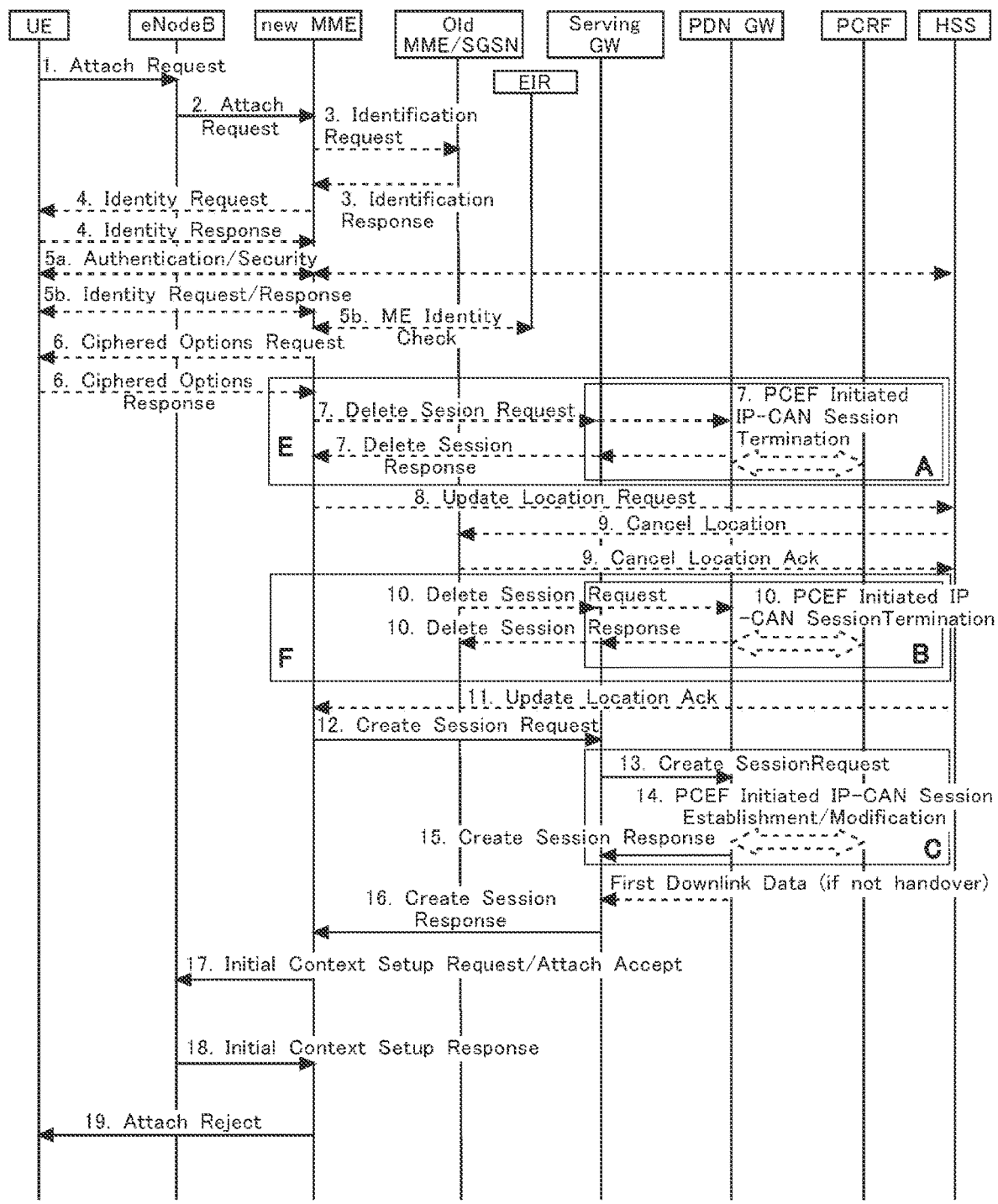
FIG. 7 is a diagram showing a flow of the Attach procedure according to the second embodiment.

Referring next to FIG. 7, a flow of the Attach procedure according to the second embodiment of the present disclosure will be explained. FIG. 7 shows a flow of processing when the Attach procedure is not normally completed in the communication system shown in FIG. 2. Since FIG. 7, 1 to FIG. 7, 17 are similar to FIG. 6, the descriptions thereof will be omitted.

When the eNodeB receives the Initial Context Setup Request message including the Resource ID in FIG. 7, 17, the eNodeB determines whether it is possible to allocate the radio resources indicated by the Resource ID to the UE.

In this example, when the eNodeB has determined that it is impossible to allocate, to the UE, the radio resources indicated by the Resource ID transmitted from the new MME, the eNodeB transmits the Initial Context Setup Response message to the new MME without transmitting the RRC Connection Reconfiguration message to the UE (FIG. 7, 18). This Initial Context Setup Response message includes information indicating that it is impossible to allocate the radio resources to the UE.

Next, the new MME transmits the Attach Reject message to the UE via the eNodeB (FIG. 7, 19). The new MME notifies the UE that the Attach procedure has not normally completed by transmitting the Attach Reject message to the UE. Therefore, the UE is notified that the radio resource included in the RAN Slice regarding the service that the LIE uses can be allocated thereto.

Figure 8:
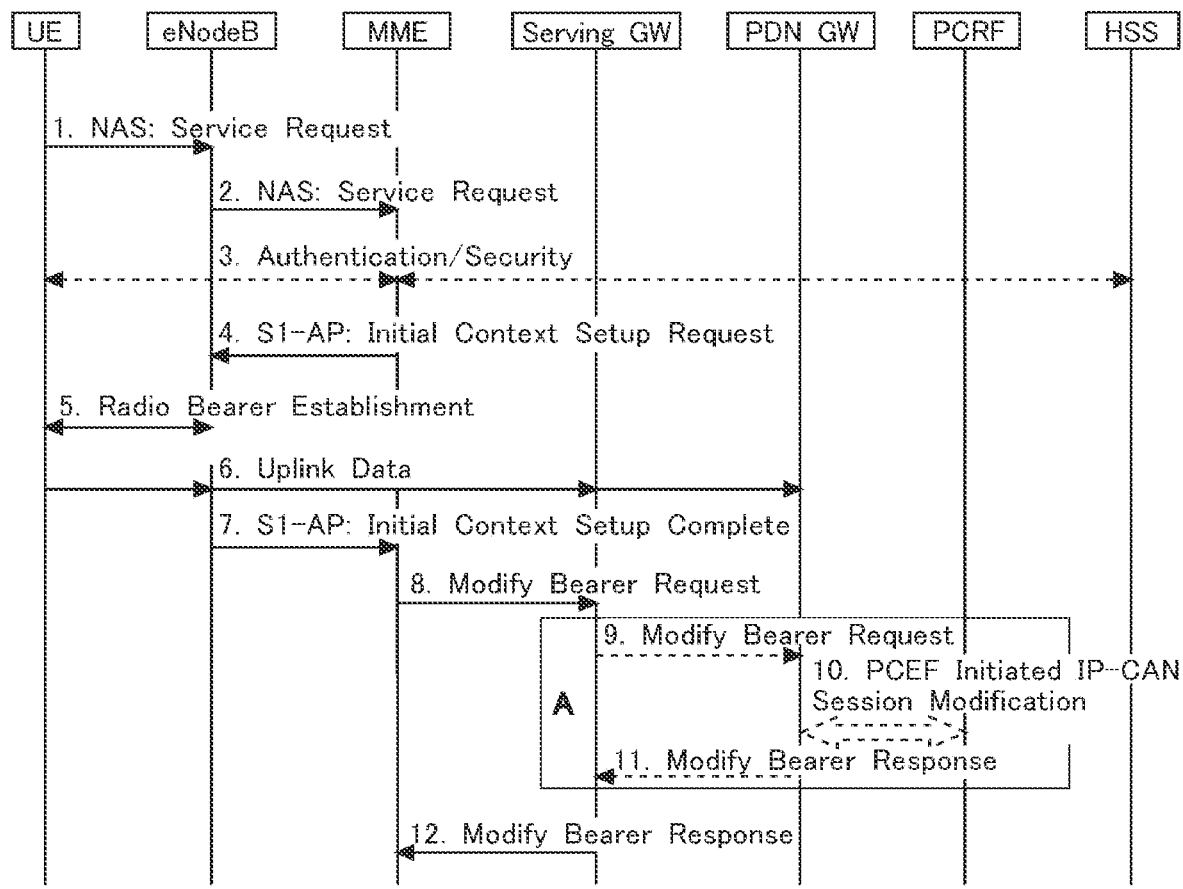
FIG. 8 is a diagram showing a flow of a UE triggered Service Request procedure according to the second embodiment.

Referring next to FIG. 8, a flow of the UE triggered Service Request procedure according to the second embodiment of the present disclosure will be explained. FIG. 8 shows a flow of processing when the UE triggered Service Request procedure is normally completed in the communication system shown in FIG. 2. The UE triggered Service Request procedure is, for example, processing executed when the UE starts data transmission, starts an outgoing call or the like. As a premise that the UE triggered Service Request procedure is executed, the Attach procedure has been normally completed and the MME manages the subscriber information regarding the UE.

The UE triggered Service Request procedure shown in FIG. 8 is based on TS23.401 V13.5.0 (2015-12) FIG. 5.3.4.1-1. UE triggered Service Request procedure. In the UE triggered Service Request procedure shown in FIG. 8, regarding the processing similar to TS23.401 V13.5.0 (2015-12) FIG. 5.3.4.1-1: UE triggered Service Request procedure, detailed descriptions thereof will be omitted.

First, the UE transmits the NAS Service Request message to the MME via the eNodeB (FIG. 8, 1 and FIG. 8, 2). The MME specifies the Service ID associated with the UE using the subscriber information regarding the UE. Next, authentication processing regarding the UE is executed between the UE and the MME and further between the MME and the HSS (FIG. 8, 3).

Next, the MME transmits the S1-AP: Initial Context Setup Request message including the Resource ID associated with the specified Service ID to the eNodeB (FIG. 8, 4).

Next, the eNodeB determines whether it is possible to allocate, to the UE, the radio resources indicated by the Resource ID transmitted from the MME. When the eNodeB determines that it is possible to allocate the radio resources indicated by the Resource ID transmitted from the new MME to the UE, the eNodeB performs Radio Bearer Establishment processing in order to allocate the radio resources indicated by the Resource ID to the UE (FIG. 8, 5). Since the processing of FIG. 8, 6 and the following processing are similar to TS23.401 V13.5.0 (2015-12) FIG. 5.3.4.1-1: UE triggered Service Request procedure, detailed descriptions thereof will be omitted. In the processing of FIG. 8, 6 and the following processing, processing for notifying the Serving GW and the PDN GW of the information regarding the radio bearer established between the UE and the eNodeB is mainly executed.

Referring next to FIG. 9, a flow of the UE triggered Service Request procedure according to the second embodiment of the present disclosure will be explained. FIG. 9 shows a flow of processing in which the UE triggered Service Request procedure is not normally completed in the communication system shown in FIG. 2. Since FIG. 9, 1 to FIG. 9, 4 are similar to FIG. 8, the descriptions thereof will be omitted.

When the eNodeB receives the S1-AP: Initial Context Setup Request message including the Resource ID in FIG. 9, 4, the eNodeB determines whether it is possible to allocate the radio resources indicated by the Resource ID to the UE.

In this example, when the eNodeB has determined that it is impossible to allocate, to the UE, the radio resources indicated by the Resource ID transmitted from the MME, the eNodeB transmits the S1-AP: Initial Context Setup Response message to the MME without executing the Radio Bearer Establishment processing (FIG. 9, 5). The S1-AP: Initial Context Setup Response message includes information indicating that it is impossible to allocate the radio resources to the UE.

Next, the MME transmits the NAS: Service Reject message to the UE via the eNodeB (FIG. 9, 6). The MME notifies the UE that the UE triggered Service Request procedure has not normally completed by transmitting the NAS: Service Reject message to the UE.

As described above, by using the communication system according to the second embodiment of the present disclosure, the MME is able to specify the radio resources to be allocated to the UE based on the service that the UE uses and the group to which the UE belongs. Specifically, the MME is able to specify the radio resources included in the RAN Slice associated with the service that the UE uses.

Accordingly, the eNodeB is able to allocate the radio resources included in the RAN Slice to the UE that uses the service associated with the RAN Slice. As a result, the eNodeB is able to prevent the radio resources included in the RAN Slice associated with a service different from the service that the UE uses from being allocated to this UE.

Further, the MME is able to specify the radio resources to be allocated to the UE using the Service ID identifying the group to which the UE belongs. Accordingly, when the RAN Slice is formed of a radio resource group to be allocated to a plurality of specific groups, it is possible to prevent the radio resources to be allocated to a group other than the group to which the UE belongs from being allocated to this UE.

Further, the eNodeB is able to determine whether it is possible to allocate the radio resources included in the Resource ID specified from the MME to the UE Accordingly, when the UE receives, from the eNodeB, a notification indicating that it is impossible to allocate radio resources to the UE, the LIE is able to re-select an eNodeB that provides the service that the UE uses, the eNodeB being another eNodeB including available radio resources.

Third Embodiment

Next, a flow of processing when the Attach procedure is normally completed according to the third embodiment of the present disclosure will be explained. In this example, processing different from the flow of processing in FIG. 6 will be mainly explained. In the second embodiment, the eNodeB determines whether it is possible to allocate the radio resources indicated by the Resource ID to the UE. On the other hand, in the third embodiment, the MME determines whether it is possible to allocate the radio resources indicated by the Resource ID to the UE.

It is assumed that the eNodeB periodically transmits, to the MME, information indicating the state in which the radio resources are allocated. That is, it is assumed that the MME holds information indicating the state in which the radio resources of the eNodeB are allocated. In this case, when the new MME receives the Update Location Ack message including the Service ID in FIG. 6, 11, this MME determines whether it is possible to allocate the Resource ID associated with the Service ID to the UE. When the new MME determines that it is possible to allocate the radio resources to the UE, it executes the processing of FIG. 6, 12 and the following processing. However, unlike the processing in the second embodiment, when the eNodeB receives the Initial Context Setup Request message in FIG. 6, 17, the eNodeB does not execute processing for determining whether it is possible to allocate radio resources to the UE.

Referring next to FIG. 10, a flow of processing when the Attach procedure is not normally completed according to the third embodiment of the present disclosure will be explained. Since FIG. 10, 1 to FIG. 10, 11 are similar to FIG. 6, 1 to FIG. 6, 11, the descriptions thereof will be omitted.

When the new MME receives the Update Location Ack message including the Service ID in FIG. 10, 11, the new MME determines whether it is possible to allocate the Resource ID associated with the Service ID to the UE. When the new MME has determined that it is impossible to allocate the radio resources to the UE, it transmits the Attach Reject message to the UE via the eNodeB without executing the processing of FIG. 6, 12 and the following processing (FIG. 10, 12). The new MME notifies the UE that the Attach procedure has not normally completed by transmitting the Attach Reject message to the UE.

Next, a flow of processing when the UE triggered Service Request procedure is normally completed according to the third embodiment of the present disclosure will be explained. In this example, processing different from the flow of processing in FIG. 8 will be mainly explained. In the second embodiment, the eNodeB determines whether it is possible to allocate the radio resources indicated by the Resource ID to the UE. On the other hand, in the third embodiment, the MME determines whether it is possible to allocate the radio resources indicated by the Resource ID to the UE.

It is assumed that the eNodeB periodically transmits, to the MME, information indicating the state in which the radio resources are allocated. That is, it is assumed that the MME holds information indicating the state in which the radio resources of the eNodeB are allocated.

In this case, when the MME receives the NAS: Service Request message in FIG. 8, 2, the MME specifies the Service ID using the subscriber information regarding the UE, and further specifies the Resource ID associated with the Service TD. The MME determines whether it is possible to allocate the radio resources indicated by the Resource ID to the UE. When the MME determines that it is possible to allocate the radio resources to the UE, the MME executes the processing of FIG. 8, 4 and the following processing. However, unlike the processing in the second embodiment, when the eNodeB has received the St-AP: Initial Context Setup Request message in FIG. 8, 4, the eNodeB does not execute processing for determining whether it is possible to allocate radio resources to the UE.

Figure 11:
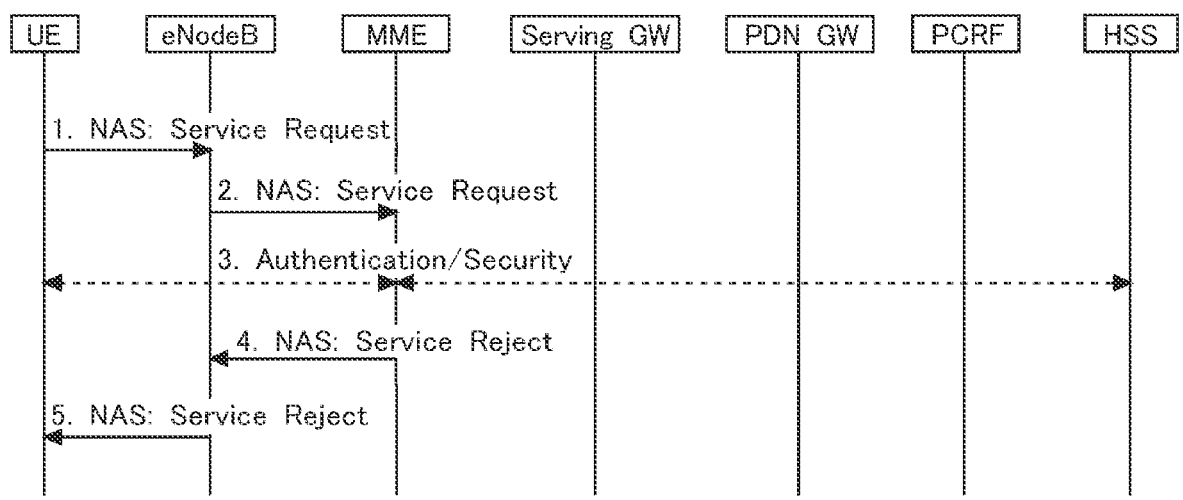
FIG. 11 is a diagram showing a flow of a UE triggered Service Request procedure according to the third embodiment.

Referring next to FIG. 11, a flow of processing when the UE triggered Service Request procedure is not normally completed according to the third embodiment of the present disclosure Will be explained. Since FIG. 11, 1 to FIG. 11, 3 are similar to FIG. 8, 1 to FIG. 8, 3, the descriptions thereof will be omitted.

When the MME receives the NAS: Service Request message in FIG. 11, 2, the MME specifies the Service ID using the subscriber information regarding the UE, and further specifies the Resource ID associated with the Service ID. The MME determines whether it is possible to allocate the radio resources indicated by the Resource ID to the UE. When the MME has determined that it is impossible to allocate the radio resources to the UE, the MME transmits the NAS: Service Reject message to the UE via the eNodeB without executing the processing of FIG. 8, 4 and the following processing (FIG. 11, 4 and FIG. 11, 5). The MME notifies the UE that the UE triggered Service Request procedure has not normally completed by transmitting the NAS: Service Reject message to the UP.

As described above, by using the communication system according to the third embodiment of the present disclosure, the MME is able to determine whether it is possible to allocate the radio resources indicated by the specified Resource ID to the UE. Accordingly, when the MME determines that it is impossible to allocate the radio resources, it is possible to stop the Attach procedure and the UE triggered Service Request procedure without executing a plurality of processing including processing for configuring the radio bearer between the eNodeB and the UE. Therefore, it is possible to reduce the number of messages in the Attach procedure and the UE triggered Service Request procedure in the case in which the MME has determined that it is impossible to allocate the radio resources relative to the number of messages in the second embodiment.

Fourth Embodiment

Referring next to FIG. 12, a configuration example of a communication system according to a fourth embodiment of the present disclosure will be explained. The communication system shown in FIG. 12, which is a communication system that supports a 3G radio communication system as a radio communication system, is a communication system defined to be the GPRS in the 3GPP.

The communication system shown in FIG. 12 includes an MS 60, a UTRAN 61, an SGSN 62, a Gateway GPRS Support Node (GGSN) 63, a Home Location Register (HLR) 64, a Packet Data Network (PDN) 65, a Mobile Switching Center (MSC)/Visited Location Register (VLR) 66, and an EIR 67.

The MS 60 is used as a general term for the radio terminal in the 3GPP. The MS may be replaced by, for example, UE. The configuration of the MS 60 is similar to that of the UE 40 shown in FIG. 3. The UTRAN 61 is a RAN that uses a 30 wireless system as a radio access system. The UTRAN 61 includes an RNC.

The SGSN 62 is a node that executes mobility management, session management and the like regarding the MS 60. The HLR 64 is a node that manages the subscriber information regarding the MS 60. The subscriber information includes information regarding the service that the MS 60 uses. The GGSN 63 is a node that relays data transmitted between the MS 60 and the PDN 65, The PDN 65 may be, for example, a network including a server apparatus or server apparatuses managed by a provider or the like that provides a service to the MS 60.

The MSC/VLR 66, which includes a Circuit Switched function, is a node that manages the subscriber information regarding the MS. The EIR 67 is a node that manages identification information on the MS (e.g., IMEI: International Mobile Equipment Identity).

A Uu reference point is defined between the MS 60 and the UTRAN 61. An Iu reference point is defined between the UTRAN 61 and the SGSN 62. A Gn reference point is defined between the SGSN 62 and the GGSN 63. A Gr reference point is defined between the SGSN 62 and the HLR 64. A Gc reference point is defined between the GGSN 63 and the HLR 64. A Gi reference point is defined between the GGSN 63 and the PDN 65. An Iu reference point is defined between the U TRAN 61 and the MSC/VLR 66. A Gs reference point is defined between the SGSN 62 and the MSC/VLR 66. A D reference point is defined between the HLR 64 and the MSC/VLR 66. A Gp reference point is defined between the SGSN 62 and the EIR 67.

The configuration of the radio resources managed in the RNC included in the UTRAN 61 is similar to that shown in FIG. 4. That is, the radio resource group managed by the eNodeB in FIG. 4 is replaced by the radio resource group managed by the RNC.

The information included in the MS 60, the RNC, the SGSN 62, the HLR 64, and the information management apparatus is similar to that shown in FIG. 5. That is, the UE 40 shown in FIG. 5 is replaced by the MS 60, the eNodeB shown in FIG. 5 is replaced by the RNC, the MME 42 shown in FIG. 5 is replaced by the SGSN 62, and the HSS 43 shown in FIG. 5 is replaced by the HLR 64.

Figure 13:
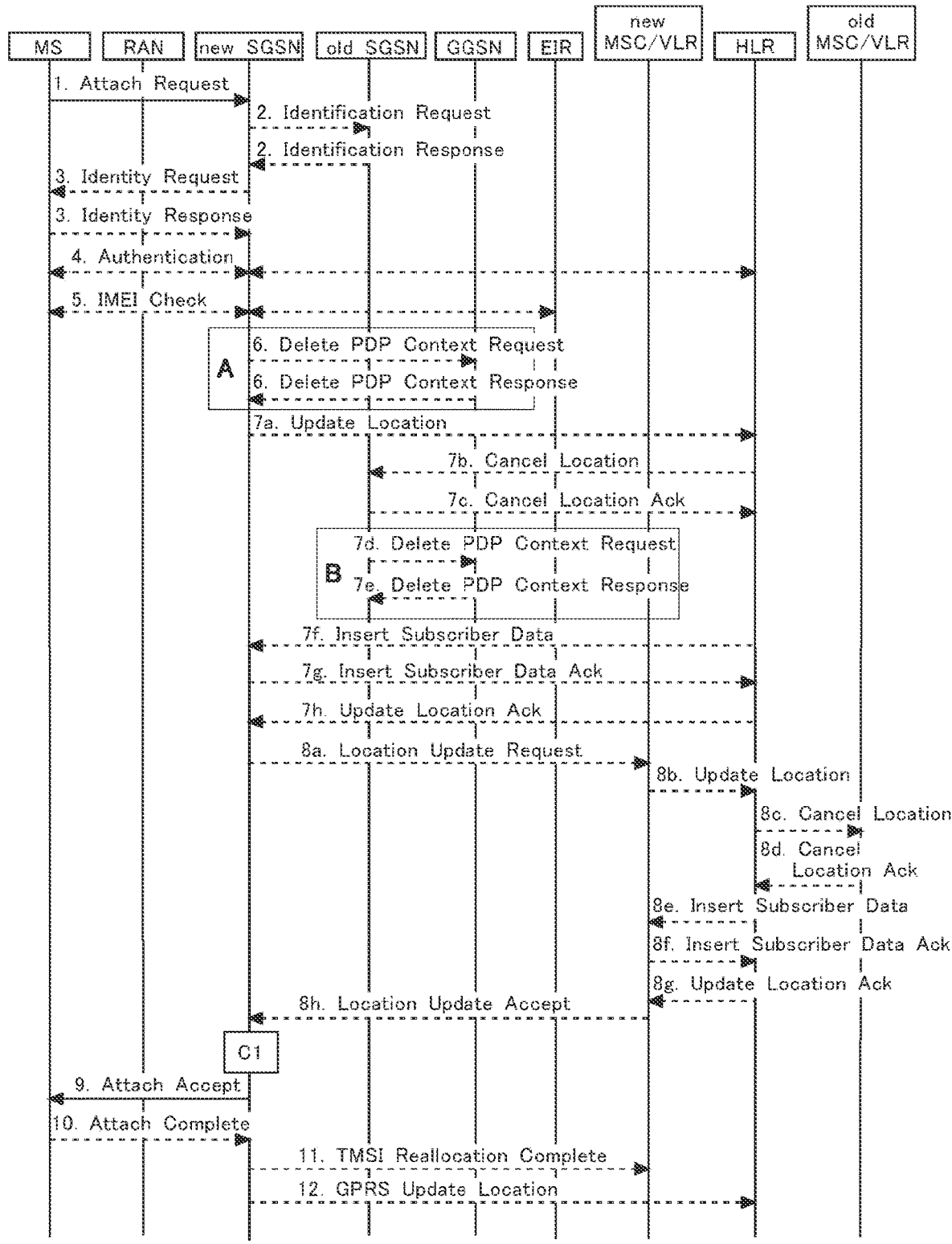
FIG. 13 is a diagram showing a flow of a Combined GPRS/IMSI Attach Procedure according to the fourth embodiment.

Referring next to FIG. 13, a Combined GPRS/IMSI Attach Procedure according to the fourth embodiment of the present disclosure will be explained. FIG. 13 shows a flow of processing when the Combined GPRS/IMSI Attach Procedure is normally completed in the communication system shown in FIG. 12. The Combined GPRS/IMSI Attach Procedure shown in FIG. 13 is based on TS23.060 V13.5.0 (2015-12) FIG. 22: Combined GPRS/IMSI Attach Procedure. In A Combined GPRS/IMSI Attach Procedure in FIG. 13, regarding the processing similar to that in TS23.060 V13.5.0 (2015-12) FIG. 22: Combined GPRS/IMSI Attach Procedure, detailed descriptions thereof will be omitted.

Further, the MS in FIG. 13 corresponds to the MS 60 shown in FIG. 12. The RAN in FIG. 13 corresponds to the UTRAN 61 shown in FIG. 12. The new SGSN shown in FIG. 13 corresponds to the SGSN 62 shown in FIG. 12. The old SGSN shown in FIG. 13 is the SGSN that has been allocated to the MS 60 in the previous Combined GPRS/IMSI Attach Procedure. In the Combined GPRS/IMSI Attach Procedure shown in FIG. 13, an operation of a case in which an SGSN (new SGSN) different from the SGSN (Old SGSN) allocated in the previous Combined GPRS/IMSI Attach Procedure has been allocated due to, for example, a movement of the MS 60, will be explained.

The GGSN shown in FIG. 13 corresponds to the GGSN 63 shown in FIG. 12. The HLR shown in FIG. 13 corresponds to the HLR 64 shown in FIG. 12. The new MSC/VLR shown in FIG. 13 corresponds to the MSC/VLR 66 shown in FIG. 12. The old MSC/VLR shown in FIG. 13 is an MSC/VLR allocated to the MS 60 in the previous Combined GPRS/IMSI Attach Procedure. The EIR shown in FIG. 13 corresponds to the FIR 67 shown in FIG. 12.

Figure 22:
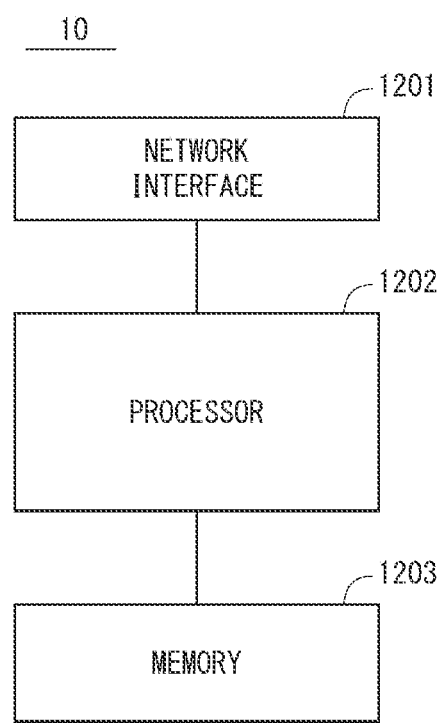
FIG. 22 is a configuration diagram of a core node according to each embodiment.

Since FIG. 13, 1 to FIG. 13, 6 are similar to the processing shown in TS23.060 V13.5.0 (2015-12) FIG. 22: Combined GPRS/IMSI Attach Procedure, detailed descriptions thereof will be omitted. In the processing of FIG. 13, 1 to FIG. 13, 6, authentication processing regarding the MS is mainly executed.

When the processing of FIG. 13, 1 to FIG. 13, 6 is completed, the new SGSN transmits the Update Location Request message to the HLR (FIG. 13, 7*a*). The Update Location Request message includes the IMSI of the MS, Since FIG. 13, 7*b* to FIG. 13, 7*e* are similar to the processing shown in TS23.060 V13.5.0 (2015-12) FIG. 22: Combined GPRS/IMSI Attach Procedure, detailed descriptions thereof will be omitted. In the processing of FIG. 13, 7*b* to FIG. 13, 7*e*, processing for deleting information regarding the MS managed in OldSGSN is mainly executed.

When the HLR acquires the IMSI of the MS in FIG. 13, 7*a*, the HLR specifies the UE Usage type associated with the acquired IMSI. Further, the HLR acquires the Service ID associated with the specified UE Usage type from the information management apparatus. When the HLR and the information management apparatus are the same apparatus, the HLR further specifies the Service ID associated with the specified UE Usage type using the specified UE Usage type.

The HLR transmits an Insert Subscriber Data message to the new SGSN (FIG. 13, 7*f*). The Insert Subscriber Data message includes a Service ID.

Since FIG. 13, 7*g* to FIG. 13, 8*h* are similar to the processing shown in TS23.060 V13.5.0 (2015-12) FIG. 22: Combined GPRS/IMSI Attach Procedure, detailed descriptions thereof will be omitted. In FIG. 13, 7*g* to FIG. 13, 8*h*, processing for registering the SGSN and the MSC/VLR allocated in the Attach Procedure this time in the HLR is mainly executed.

While it has been described that the Service ID is included in the Insert Subscriber Data message in FIG. 13, 7*f*, the Service ID may be included in the Update Location Ack message in FIG. 13, 7*h*.

Since FIG. 13, 9 to FIG. 13, 12 are similar to the processing shown in TS23.060 V13.5.0 (2015-12) FIG. 22: Combined GPRS/IMSI Attach Procedure, detailed descriptions thereof will be omitted. In FIG. 13, 9 to FIG. 13, 12, processing in accordance with the completion of the Attach Procedure is mainly executed.

Figure 14:
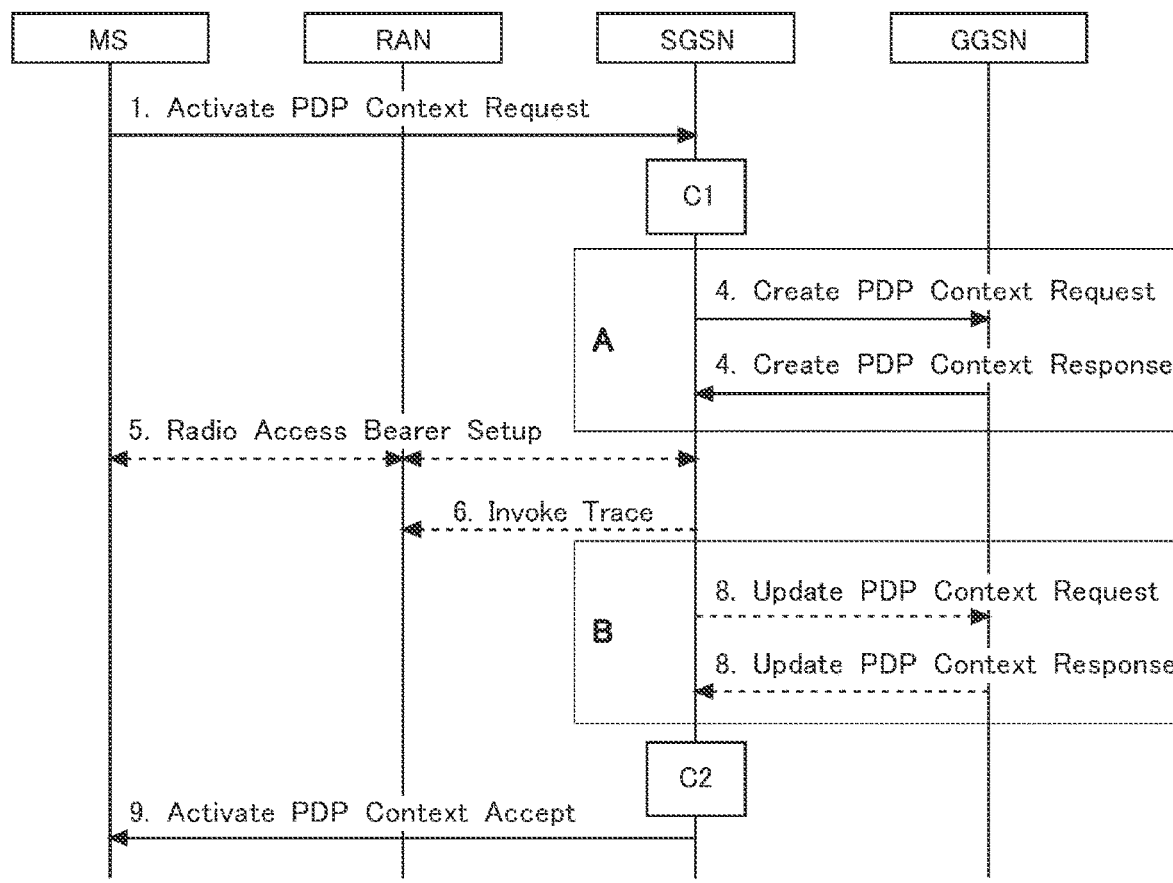
FIG. 14 is a diagram showing a flow of a PDP Context Activation Procedure for Iu mode according to the fourth embodiment.

Referring next to FIG. 14, a PDP Context Activation Procedure for Iu mode according to the fourth embodiment of the present disclosure will be explained. The PDP Context Activation Procedure for Iu mode shown in FIG. 14 is based on TS23.060 V13.5.0 (2015-12) FIG. 64: PDP Context Activation Procedure for Iu mode. In the PDP Context Activation Procedure for Iu mode in FIG. 14, regarding the processing similar to that in TS23.060 V13.5.0 (2015-12) FIG. 64: PDP Context Activation Procedure for Iu mode, detailed descriptions thereof will be omitted.

The PDP Context Activation Procedure for Iu mode is, for example, processing that is executed when the MS starts transmitting data or starts an outgoing call. As a premise that the PDP Context Activation Procedure for Iu mode is executed, it is assumed that the Attach procedure has been normally completed and the SGSN manages the subscriber information regarding the MS.

First, the MS transmits the Activate PDP Context Request message to the SGSN via RAN (FIG. 14, 1). The SGSN specifies the Service ID associated with the MS using the subscriber information of the MS. Since FIG. 14, 4 is the processing similar to TS23.060 V13.5.0 (2015-12) FIG. 64: PDP Context Activation Procedure for Iu mode, detailed descriptions thereof will be omitted. In FIG. 14, 4, processing for establishing a session or a bearer used by the MS between the SGSN and the GGSN is mainly executed.

The SGSN notifies the RAN of the Resource ID associated with the specified Service ID in the Radio Access Bearer processing (FIG. 14, 5) Further, the RAN determines whether it is possible to allocate, to the MS, the radio resources indicated by the Resource ID regarding which a notification has been sent from the SGSN. When the RAN has determined that it is possible to allocate, to the MS, the radio resources indicated by the Resource ID transmitted from the SGSN, the RAN allocates the radio resources indicated by the Resource ID to the MS in the Radio Access Bearer Setup processing in FIG. 14, 5. Since the processing of FIG. 14, 6 and the following processing are similar to TS23.060 V 13.5.0 (2015-12) FIG. 64: PDP Context Activation Procedure for Iu mode, detailed descriptions thereof will be omitted. Regarding the processing shown in FIG. 8, 6 and the following processing, processing for notifying the GGSN of information regarding the radio bearer established between the MS and the RAN is mainly executed.

Figure 15:
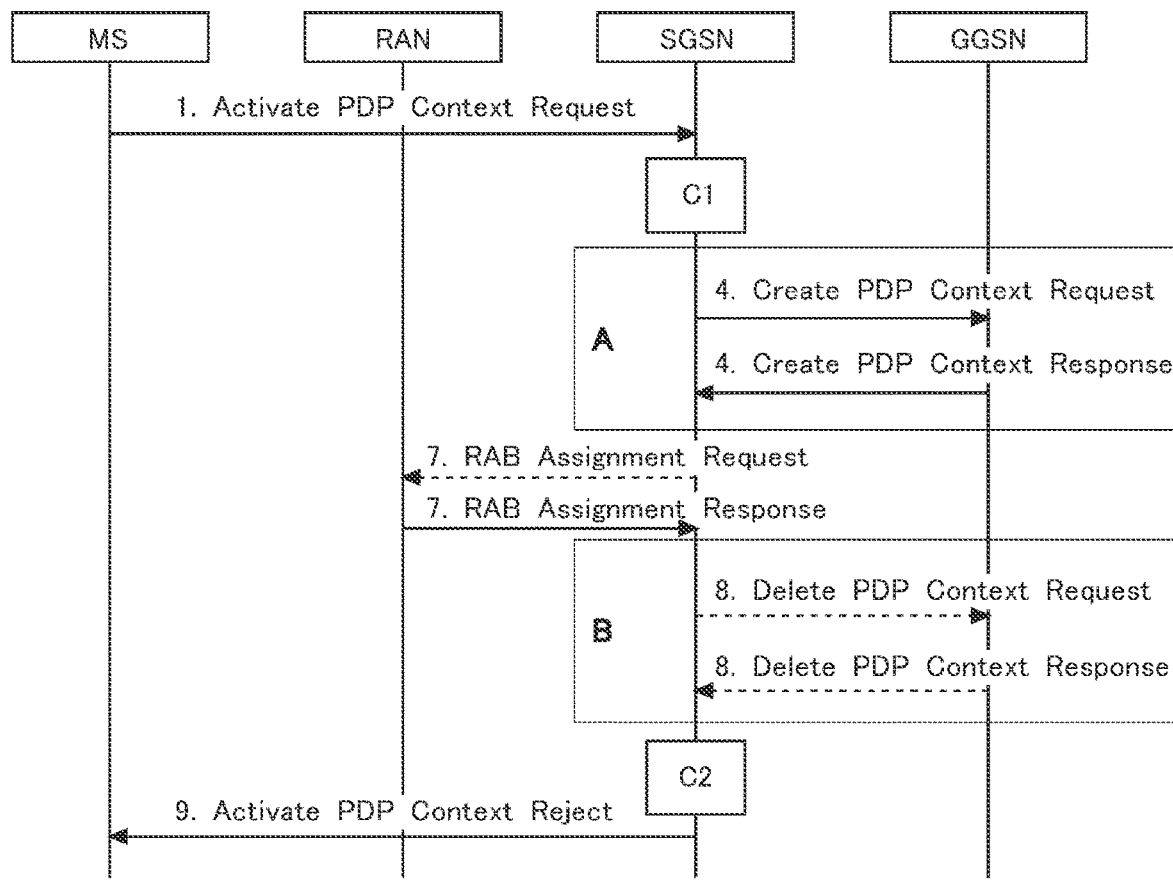
FIG. 15 is a diagram showing a flow of the PDP Context Activation Procedure for Iu mode according to the fourth embodiment.

Referring next to FIG. 15, a flow of the PDP Context Activation Procedure for Iu mode according to the fourth embodiment of the present disclosure will be explained. FIG. 15 shows a flow of processing when the PDP Context Activation Procedure for In mode is not normally completed in the communication system shown in FIG. 12. Since FIG. 15, 1 and FIG. 15, 4 are similar to FIG. 14, the descriptions thereof will be omitted.

The SGSN transmits a RAB Assignment Request message including the Resource ID to the RAN (FIG. 15, 7). When the RAN receives the RAB Assignment Request message including the Resource ID in FIG. 15, 7, the RAN determines whether it is possible to allocate the radio resources indicated by the Resource ID to the MS.

When the RAN determines that it is impossible to allocate the radio resources indicated by the Resource ID transmitted from the SGSN to the MS, the RAN transmits the RAB Assignment Response message to the SGSN without establishing the radio bearer between the RAN and the MS (FIG. 15, 7).

Next, the SGSN transmits or receives a Delete PDP Context Request/Response message to or from the GGSN in order to delete the PDP Context with the GGSN set in FIG. 15, 4 (FIG. 15, 8).

Next, the SGSN transmits the Activate PDP Context Reject message to the MS via the RAN (FIG. 15, 9). The SGSN notifies the MS that the PDP Context Activation Procedure for Iu mode has not normally completed by transmitting the Activate PDP Context Reject message to the MS.

Referring next to FIG. 16, an MS Initiated Service Request Procedure using GN/Gp according to the fourth embodiment of the present disclosure will be explained. The MS Initiated Service Request Procedure using GN/Gp shown in FIG. 16 is based on TS23.060 V13.5.0 (2015-12) FIG. 50: MS Initiated Service Request Procedure using GN/Gp. In the MS Initiated Service Request Procedure using GN/Gp shown in FIG. 16, regarding processing similar to that in TS23.060 V13.5.0 (2015-12) FIG. 50: MS Initiated Service Request Procedure using GN/Gp, detailed descriptions thereof will be omitted.

FIG. 16 shows a flow of processing of a case in which the MS Initiated Service Request Procedure using GN/Gp is normally completed in the communication system shown in FIG. 12. The MS Initiated Service Request Procedure using GN/Gp is, for example, processing that is executed when the MS starts transmitting data or starts an outgoing call. As a premise that the MS Initiated Service Request Procedure using ON/Gp is executed, it is assumed that the Attach procedure has been normally completed and the SGSN manages the subscriber information regarding the MS.

In FIG. 16, the RAN in FIGS. 13 to 15 is described to be the RNC included in the UTRAN 61. Since FIG. 16, 1 is similar to the processing shown in TS23.060 V13.5.0 (2015-12) FIG. 50: MS Initiated Service Request Procedure using GN/Gp, detailed descriptions thereof will be omitted.

Next, the MS transmits the Service Request message to the SGSN via the RNC (FIG. 16, 2). The SGSN specifies the Service ID associated with the MS using the subscriber information regarding the MS. Next, authentication processing regarding the MS is executed between the MS and the RNC, between the RNC and the SGSN, and between the SGSN and the HLR (FIG. 16, 3).

Next, the SGSN transmits a Radio Access Bearer Assignment Request message including the Resource ID associated with the specified Service ID to the RNC (FIG. 16, 4).

Next, the RNC determines whether it is possible to allocate, to the MS, the radio resources indicated by the Resource ID transmitted from the SGSN. When the RNC has determined that it is possible to allocate, to the MS, the radio resources indicated by the Resource ID transmitted from the SGSN, the RNC transmits a Radio Bearer Setup message in order to allocate the radio resources indicated by the Resource ID to the MS (FIG. 16, 5). Since processing of FIG. 16, 6 and the following processing are similar to TS23.060 V13.5.0 (2015-12) FIG. 50: MS Initiated Service Request Procedure using GN/Gp, detailed descriptions thereof will be omitted.

Figure 17:
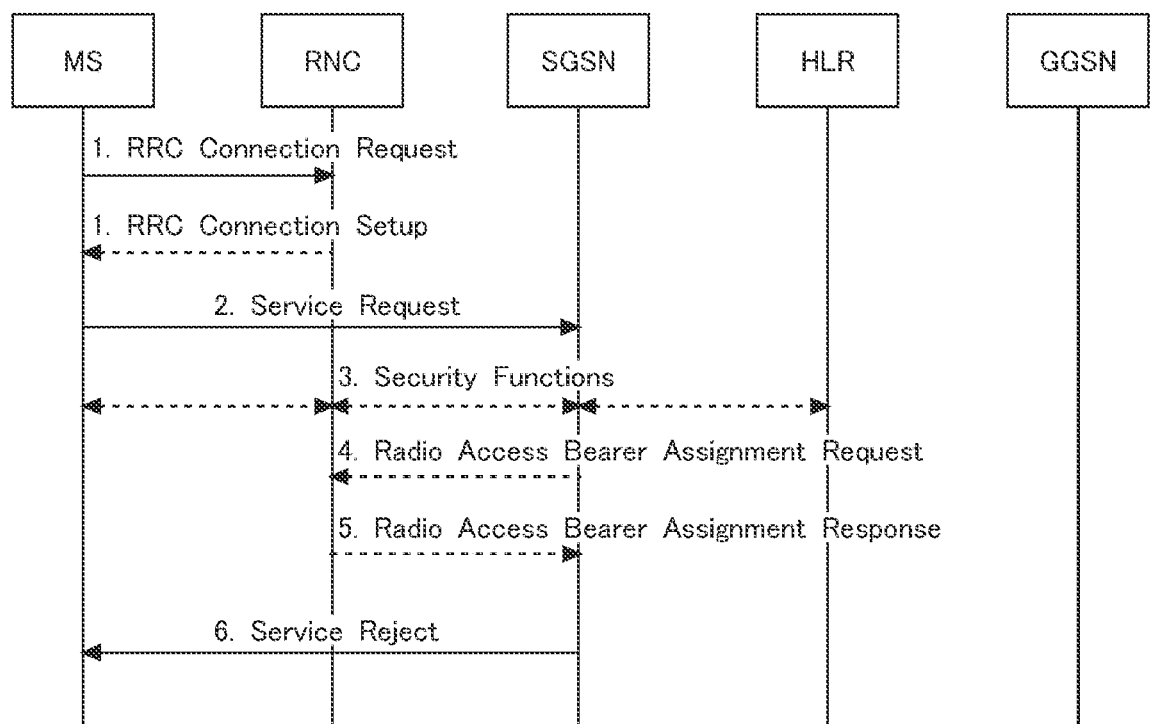
FIG. 17 is a diagram showing the MS Initiated Service Request Procedure using GN/Gp according to the fourth embodiment.

Referring next to FIG. 17, the MS Initiated Service Request Procedure using GN/Gp according to the fourth embodiment of the present disclosure will be explained. FIG. 17 shows a flow of processing when the MS Initiated Service Request Procedure using GN/Gp is not normally completed in the communication system shown in FIG. 12.

Since FIG. 17, 1 to FIG. 17, 4 are similar to FIG. 16, 1 to FIG. 16, 4, the descriptions thereof will be omitted. The RNC determines whether it is possible to allocate, to the MS, the radio resources indicated by the Resource ID transmitted from the SGSN in FIG. 17, 4. When the RNC determines that it is impossible to allocate, to the MS, the radio resources indicated by the Resource ID transmitted from the SGSN, the RNC transmits a Radio Access Bearer Assignment Response message to the SGSN without transmitting the Radio Bearer Setup message to the MS (FIG. 17, 5). Next, the SGSN transmits the Service Reject message to the MS via the RNC (FIG. 17, 6). The SGSN notifies the MS that the MS Initiated Service Request Procedure using GN/Gp has not normally completed by transmitting the Service Reject message to the MS.

As described above, by using the communication system according to the fourth embodiment of the present disclosure, similar to the case in which the EPS is used, the RAN or the RNC is able to prevent radio resources included in the RAN Slice associated with a service other than the service that is used by the MS from being allocated to this MS.

Further, the SGSN is able to specify the radio resources to be allocated to the MS using the Service ID that identifies the group to which the MS belongs. Accordingly, when the RAN Slice is formed of a radio resource group allocated to a plurality of specific groups, it is possible to prevent the radio resources allocated to a group different from the group to which the MS belongs from being allocated to this MS.

Alternatively, the RAN or the RNC is able to determine whether it is possible to allocate the radio resources included in the Resource ID specified by the SGSN to the MS. Accordingly, when the MS receives a notification indicating that it is impossible to allocate radio resources from the RAN, the MS is able to re-select a RAN that provides the service the MS uses, the RAN being another RAN including available radio resources.

Fifth Embodiment

Next, a flow of processing when the PDP Context Activation Procedure for Iu mode is normally completed according to the fifth embodiment of the present disclosure will be explained. In this example, processing different from the flow of the processing in FIG. 14 will be mainly explained. In the fourth embodiment, the RAN determines whether it is possible to allocate, to the MS, the radio resources indicated by the Resource ID. On the other hand, in the fifth embodiment, the SGSN determines whether it is possible to allocate the radio resources indicated by the Resource ID to the MS.

It is assumed that the RAN periodically transmits, to the SGSN, information indicating the state in which the radio resources are allocated, That is, it is assumed that the SGSN holds information indicating the state in which radio resources of the RAN are allocated.

In this case, when the SGSN receives the Activate PDP Context Request message in FIG. 14, 1, the SGSN specifies the Service ID using the subscriber information regarding the MS, and further specifies the Resource ID associated with the Service ID. The SGSN determines whether it is possible to allocate the radio resources indicated by the Resource ID to the MS. When the SGSN determines that it is possible to allocate the radio resources to the MS, the SGSN executes processing of FIG. 14, 4 and the following processing. However, the RAN does not execute the processing for determining whether it is possible to allocate the radio resources to the MS in FIG. 14, 5.

Figure 18:
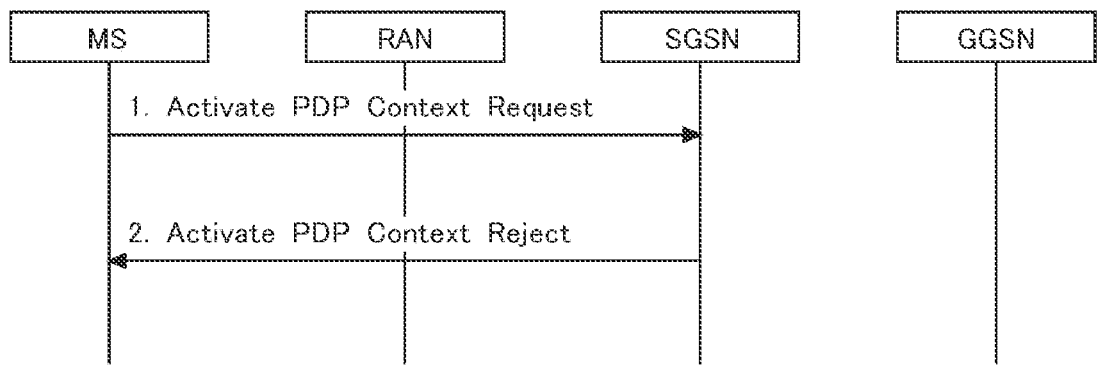
FIG. 18 is a diagram showing a flow of a PDP Context Activation Procedure for Iu mode according to a fifth embodiment.

Referring next to FIG. 18, a flow of processing when the PDP Context Activation Procedure for Iu mode is not normally completed according to the fifth embodiment of the present disclosure will be explained. Since FIG. 18, 1 is similar to FIG. 14, 1, the descriptions thereof will be omitted.

When the SGSN receives the Activate PDP Context Request message in FIG. 18, 1, the SGSN specifies the Service ID using the subscriber information regarding the MS, and further specifies the Resource ID associated with the Service ID. The SGSN determines whether it is possible to allocate the radio resources indicated by the Resource ID to the MS. When the SGSN determines that it is impossible to allocate the radio resources to the MS, the SGSN transmits the Activate PDP Context Reject message to the MS via RAN without executing the processing of FIG. 14, 4 and the following processing (FIG. 18, 2). The SGSN notifies the UE that the PDP Context Activation Procedure for Iu mode has not normally completed by transmitting the Activate PDP Context Reject message to the MS.

Next, a flow of processing when the MS Initiated Service Request Procedure using GN/Gp is normally completed according to the fifth embodiment of the present disclosure will be explained. In this example, processing different from the flow of the processing in FIG. 16 will be mainly explained. In the fourth embodiment, the RAN determines whether it is possible to allocate the radio resources indicated by the Resource ID to the MS. On the other hand, in the fifth embodiment, the SGSN determines whether it is possible to allocate the radio resources indicated by the Resource ID to the MS.

It is assumed that the RAN periodically transmits, to the SGSN, information indicating the state in which the radio resources are allocated. That is, it is assumed that the SGSN holds information indicating the state in which the radio resources of the RAN are allocated.

In this case, when the SGSN receives the Service Request message in FIG. 16, 2, the SGSN specifies the Service ID using the subscriber information regarding the MS, and further specifies the Resource ID associated with the Service ID. The SGSN determines whether it is possible to allocate the radio resources indicated by the Resource TD to the MS. The SGSN executes the processing of FIG. 16, 3 and the following processing when the SGSN determines that it is possible to allocate the radio resources to the MS. However, the RAN does not execute the processing for determining whether it is possible to allocate the radio resources to the MS in FIG. 16, 4.

Referring next to FIG. 19, a flow of processing when the MS Initiated Service Request Procedure using GN/Gp is not normally completed according to the fifth embodiment of the present disclosure will be explained. Since FIG. 19, 1 to FIG. 19, 3 are similar to FIG. 16, 1 to FIG. 16, 3, the descriptions thereof will be omitted.

When the SGSN receives the Service Request message in FIG. 19, 2, the SGSN specifies the Service ID using the subscriber information regarding the MS, and further specifies the Resource ID associated with the Service ID. The SGSN determines whether it is possible to allocate the radio resources indicated by the Resource ID to the MS. When the SGSN determines that it is impossible to allocate the radio resources to the MS, the SGSN transmits the Service Reject message to the MS via the RNC without executing the processing of FIG. 16, 4 and the following processing (FIG. 19, 4). The SGSN notifies the UE that the MS Initiated Service Request Procedure using GN/Gp has not normally completed by transmitting the Service Reject message to the MS.

As described above, by using the communication system according to the fifth embodiment of the present disclosure, the SGSN is able to determine whether it is possible to allocate the radio resources indicated by the specified Resource ID to the UE. Accordingly, when the SGSN determines that it is impossible to allocate the radio resources, it is possible to stop the Attach procedure, the PDP Context Activation Procedure for Iu mode, and the MS Initiated Service Request Procedure using GN/Gp without executing a plurality of processing including processing for configuring a radio bearer between the RAN (RNC) and the MS. Therefore, it is possible to reduce the number of messages of the Attach procedure, the PDP Context Activation Procedure for Iu mode, and the MS Initiated Service Request Procedure using GN/Gp in the case in which the SGSN has determined that it is impossible to allocate the radio resources.

Figure 20:
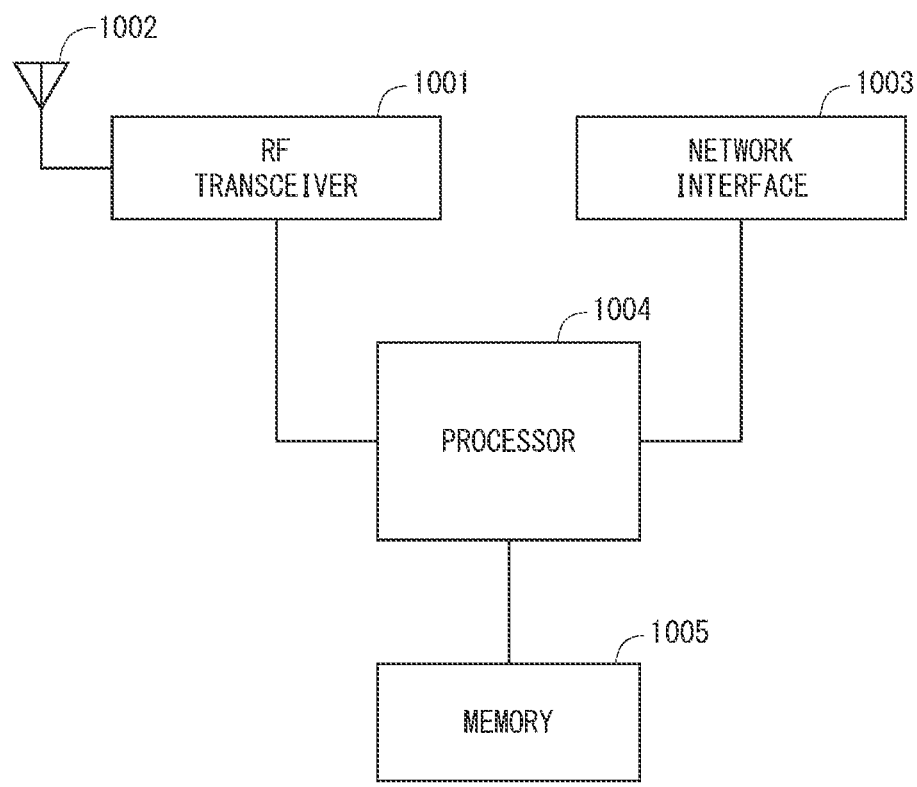
FIG. 20 is a configuration diagram of a base station according to each embodiment.

Next, in the following description, configuration examples of the core node 10, the base station 20, and the radio terminal 30 described in the aforementioned embodiments will be explained. FIG. 20 is a block diagram showing a configuration example of the base station 20. Referring to FIG. 20, the base station 20 includes an RF transceiver 1001, a network interface 1003, a processor 1004, and a memory 1005. The RE transceiver 1001 performs analog RE signal processing to communicate with the UEs. The RF transceiver 1001 may include a plurality of transceivers. The RF transceiver 1001 is coupled to an antenna 1002 and the processor 1004. The RF transceiver 1001 receives modulated symbol data (or OFDM symbol data) from the processor 1004, generates a transmission RF signal, and supplies the transmission RF signal to the antenna 1002.

Further, the RF transceiver 1001 generates a baseband reception signal based on a reception RF signal received by the antenna 1002 and supplies this signal to the processor 1004.

The network interface 1003 is used to communicate with the network node (e.g., core node 10). The network interface 1003 may include, for example, a network interface card (NIC) conforming to the IEEE 802.3 series.

The processor 1004 performs data plane processing including digital baseband signal processing and control plane processing for radio communication. In the case of LTE and LTE-Advanced, for example, the digital baseband signal processing by the processor 1004 may include signal processing of the MAC layer and the PHY layer.

The processor 1004 may include a plurality of processors. The processor 1004 may include, for example, a modem processor (e.g. DSP) that performs the digital baseband signal processing and a protocol stack processor (e.g., a CPU or an MPU) that performs the control plane processing.

The memory 1005 is composed of a combination of a volatile memory and a non-volatile memory. The memory 1005 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1005 may include a storage that is located apart from the processor 1004. In this case, the processor 1004 may access the memory 1005 via the network interface 1003 or an I/O interface (not shown).

The memory 1005 may store a software module (computer program) including instructions and data for performing processing by the base station 20 described in the aforementioned embodiments. In some implementations, the processor 1004 may load the software module from the memory 1005 and execute the loaded software module, thereby performing the processing of the remote node 10 described in the aforementioned embodiments.

Figure 21:
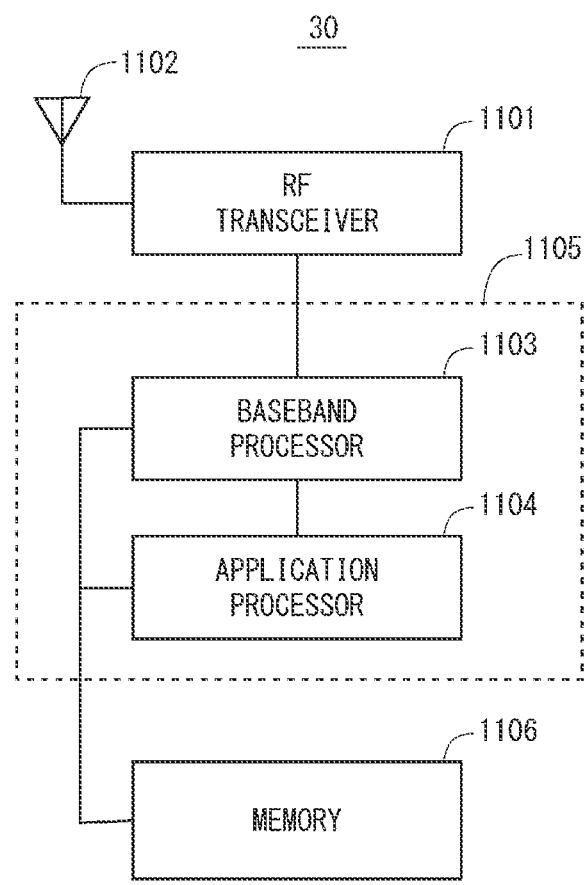
FIG. 21 is a configuration diagram of a radio terminal according to each embodiment.

FIG. 21 is a block diagram showing a configuration example of the radio terminal 30. A Radio Frequency (RF) transceiver 1101 performs analog RF signal processing to communicate with the base station 20. The analog RE signal processing performed by the RF transceiver 1101 includes frequency up-conversion, frequency down-conversion, and amplification. The RF transceiver 1101 is coupled to an antenna 1102 and a baseband processor 1103. That is, the RF transceiver 1101 receives modulated symbol data (or OFDM symbol data) from the baseband processor 1103, generates a transmission RF signal, and supplies the transmission RF signal to the antenna 1102. Further, the RF transceiver 1101 generates a baseband reception signal based on a reception RF signal received by the antenna 1102, and supplies the baseband reception signal to the baseband processor 1103.

The baseband processor 1103 performs digital baseband signal processing (i.e., data plane processing) and control plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control plane processing includes communication management of layer 1 (e.g., transmission power control), layer 2 (e.g., radio resource management and hybrid automatic repeat request (HARQ) processing), and layer 3 (e.g., signalling regarding attach, mobility, and call management).

In the case of LTE and LTE-Advanced, for example, the digital baseband signal processing by the baseband processor 1103 may include signal processing of a Packet Data Convergence Protocol (PDCP) layer, a Radio Link Control (RLC) layer, a MAC layer, and a PHY layer. Further, the control plane processing by the baseband processor 1103 may include processing of a Non-Access Stratum (NAS) protocol, an RRC protocol, and MAC CE.

The baseband processor 1103 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control plane processing. In this case, the protocol stack processor, which performs control plane processing, may be integrated with an application processor 1104 described in the following.

The application processor 1104 is also referred to as a CPU, an MPU, a microprocessor, or a processor core. The application processor 1104 may include a plurality of processors (processor cores). The application processor 1104 executes a system software program (Operating System (OS)) and various application programs (e.g., a voice call application, a WEB browser, a mailer, a camera operation application, and a music player application) loaded from a memory 1106 or from another memory (not shown), thereby providing various functions of the radio terminal 30.

In some implementations, as represented by a dashed line (1105) in FIG. 21, the baseband processor 1103 and the application processor 1104 may be integrated on a single chip. In other words, the baseband processor 1103 and the application processor 1104 may be implemented in a single System on Chip (SoC) device 1105. An SoC device may be referred to as a system Large Scale Integration (LSI) or a chipset.

The memory 1106 is a volatile memory, a non-volatile memory, or a combination thereof. The memory 1106 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1106 may include, for example, an external memory device that can be accessed from the baseband processor 1103, the application processor 1104, and the SoC 1105. The memory 1106 may include an internal memory device that is integrated in the baseband processor 1103, the application processor 1104, or the SoC 1105. Further, the memory 1106 may include a memory in a Universal Integrated Circuit Card (UICC).

The memory 1106 may store a software module (computer program) including instructions and data for performing processing by the radio terminal 30 described in the aforementioned embodiments. In some implementations, the baseband processor 1103 or the application processor 1104 may load the software module from the memory 1106 and execute the loaded software module, thereby performing the processing of the radio terminal 30 described in the aforementioned embodiments.

FIG. 22 is a block diagram showing the configuration example of the core node 10. Referring to FIG. 22, a center node 20 includes a network interface 1201, a processor 1202, and a memory 1203. The network interface 1201 is used to communicate with the network node (e.g., the base station 20). The network interface 1201 may include, for example, a network interface card (NIC) conforming to the IEEE 802.3 series.

The processor 1202 loads software (computer program) from the memory 1203 and executes the loaded software, thereby performing the processing of the core node 10 described with reference to the sequence diagrams and flowcharts in the aforementioned embodiments. The processor 1202 may be, for example, a microprocessor, an MPU, or a CPU. The processor 1202 may include a plurality of processors.

The processor 1202 performs data plane processing including digital baseband signal processing and control plane processing for radio communication. In the case of LTE and LTE-Advanced, for example, the digital baseband signal processing by the processor 1004 may include signal processing of the PDCP layer, the RLC layer, and the MAC layer. Further, the signal processing by the processor 1202 may include signal processing of the GTP-U·UDP/IP layer in the X2-U interface and the S1-U interface. Further, the control plane processing by the processor 1004 may include processing of the X2AP protocol, the S1-AME protocol, and the RRC protocol.

The processor 1202 may include a plurality of processors. The processor 1004 may include, for example, a modem processor (e.g., a DSP) that performs the digital baseband signal processing, a processor (e.g., DSP) that performs the signal processing of the GTP-U UDP/IP layer on the X2-U interface and the S1-U interface, and a protocol stack processor (e.g., a CPU or an MPU) that performs the control plane processing.

The memory 1203 is composed of a combination of a volatile memory and a non-volatile memory. The memory 1203 may include a storage that is located apart from the processor 1202. In this case, the processor 1202 may access the memory 1203 via an I/O interface (not shown).

In the example shown in FIG. 22, the memory 1203 is used to store software modules. The processor 1202 loads these software modules from the memory 1203 and executes these loaded software modules, thereby performing the processing of the core node 10 described in the aforementioned embodiments.

As described above with reference to FIGS. 20 to 22, each of the processors included in the base station 20, the radio terminal 30, and the core node 10 according to the aforementioned embodiments executes one or more programs including instructions to cause a computer to perform an algorithm described with reference to the drawings.

In the aforementioned examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g, electric wires, and optical fibers) or a wireless communication line.

The present disclosure is not limited to the aforementioned embodiments and may be changed as appropriate without departing from the spirit of the present disclosure. Further, the present disclosure may be executed by combining the embodiments as appropriate.

While the present disclosure has been described with reference to the embodiments, the present disclosure is not limited to the aforementioned embodiments. Various changes that can be understood by those skilled in the art can be made to the configurations and the details of the present disclosure within the scope of the present disclosur.

This application is based upon and claims the benefit of priority from Japanese Patent Application No 2016-058260, filed on Mar. 23, 2016, the disclosure of which is incorporated herein in its entirety by reference.

For example, some or all of the embodiments disclosed above can be described as, but not limited to, the following supplementary notes.

Supplementary Note 1

A core node comprising:
a determination unit configured to determine a radio resource to be allocated in accordance with a service provided for a radio terminal; and
a communication unit configured to transmit resource identification information indicating the radio resource determined in the determination unit to a base station that manages a plurality of radio resources for each RAN Slice associated with a service.

Supplementary Note 2

The core node according to Supplementary Note 1, wherein the determination unit manages service identification information that indicates a service that the radio terminal uses and is uniquely identified in a mobile core network and the resource identification information in association with each other and acquires the service identification information from a management apparatus that manages terminal identification information of the radio terminal and the service identification information in association with each other.

Supplementary Note 3

The core node according to Supplementary Note 2, wherein the service identification information uniquely identified in the mobile core network is used as the resource identification information.

Supplementary Note 4

The core node according to any one of Supplementary Notes 1 to 3, wherein the determination unit determines whether there is a radio resource to be allocated to the radio terminal in a RAN Slice that provides a service that is used by the radio terminal based on a usage situation of a radio resource in the base station.

Supplementary Note 5

The core node according to Supplementary Note 4, wherein the communication unit transmits a reject message indicating that it is impossible to allocate a radio resource to the radio terminal via the base station when it is determined in the determination unit that there is no radio resource to be allocated to the radio terminal.

Supplementary Note 6

A base station comprising:
a management unit configured to manage a plurality of radio resources for each RAN Slice associated with a service;
a communication unit configured to receive resource identification information that has been transmitted from a core node and indicates a radio resource to be allocated in accordance with a service provided for a radio terminal; and
a resource allocation unit configured to allocate the radio resource indicated by the resource identification information to the radio terminal.

Supplementary Note 7

The base station according to Supplementary Note 6, wherein the resource allocation unit determines whether to allocate the radio resource indicated by the resource identification information to the radio terminal in accordance with a usage situation of a radio resource.

Supplementary Note 8

The base station according to Supplementary Note 7, further comprising a communication unit configured to transmit a reject message indicating that it is impossible to allocate a radio resource to the radio terminal when it is determined that there is no radio resource to be allocated to the radio terminal in the resource allocation unit.

Supplementary Note 9

A radio terminal comprising:
a receiver configured to receive broadcast information items transmitted from a plurality of respective base stations; and
a determination unit configured to determine that the radio terminal should be connected to a base station among the plurality of base stations that has transmitted broadcast information including RAN Slice identification information indicating a RAN Slice that provides a service that the radio terminal uses.

Supplementary Note 10

The radio terminal according to Supplementary Note 9, wherein the determination unit determines, when there are a plurality of base stations that have transmitted broadcast information including RAN Slice identification information indicating a RAN Slice that provides a service to be used, a base station to which the radio terminal is connected based on radio field intensities of radio waves output from the respective base stations.

Supplementary Note 11

The radio terminal according to Supplementary Note 9 or 10, wherein the determination unit determines, when the determination unit has received a reject message indicating that it is impossible to allocate a radio resource from the base station, that the radio terminal should be connected to a base station other than the base station that has been determined, from among a plurality of base stations that have transmitted broadcast information including RAN Slice identification information indicating a RAN Slice that provides a service to be used.

Supplementary Note 12

A communication method comprising:
determining a radio resource to be allocated in accordance with a service to be provided for a radio terminal; and
transmitting resource identification information indicating the radio resource that has been determined to a base station that manages a plurality of radio resources for each RAN Slice associated with a service.

Supplementary Note 13

A radio resource allocation method comprising:
managing a plurality of radio resources for each RAN Slice associated with a service;
receiving resource identification information that has been transmitted from a core node and indicates a radio resource to be allocated in accordance with a service provided for a radio terminal; and
allocating the radio resource indicated by the resource identification information to the radio terminal.

Supplementary Note 14

A base station selection method comprising:
receiving broadcast information items transmitted from a plurality of respective base stations; and
determining that a connection should be established with a base station among the plurality of base stations that has transmitted broadcast information including RAN Slice identification information indicating a RAN Slice that provides a service to be used.

Supplementary Note 15

A program for causing a computer to execute the following processing of:
determining a radio resource to be allocated in accordance with a service to be provided for a radio terminal; and
transmitting resource identification information indicating the radio resource that has been determined to a base station that manages a plurality of radio resources for each RAN Slice associated with a service.

REFERENCE SIGNS LIST

10 CORE NODE
12 COMMUNICATION UNIT
14 DETERMINATION UNIT
20 BASE STATION
22 COMMUNICATION UNIT
24 MANAGEMENT UNIT
26 RESOURCE ALLOCATION UNIT
30 RADIO TERMINAL
40 UE
41 E-UTRAN
42 MME
43 HSS
44 SGSN
45 SGW

46 PGW
47 PCRF
48 UTRAN
49 GERAN
50 OPERATORS IP SERVICES
60 MS
61 UTRAN
62 SGSN
63 GGSN
64 HLR
65 PDN
66 MSC/VLR
67 EIR
71 COMMUNICATION UNIT
72 RAN SLICE AVAILABILITY DETERMINATION UNIT
73 CONNECTION DESTINATION RAN SLICE SELECTION UNIT
81 CONTROLLER
82 COMMUNICATION UNIT

The invention claimed is:

1. A User Equipment (UE), the UE comprising:
at least one processor; and
at least one memory coupled to the at least one processor, the at least one memory storing instructions that when executed by the at least one processor cause the at least one processor to:
pre-configure first network slice information comprising an identification (ID) of a network slice associated with at least one service that the UE uses, wherein the first network slice information is stored in the UE,
receive broadcast information related to second network slice information from a Radio Access Network (RAN),
determine third network slice information based on the first network slice information, and
send, to the RAN, the third network slice information to execute connection processing based on the third network slice information.

2. The UE of claim 1, wherein the broadcast information is broadcasted using a Broadcast Control Channel (BCCH).

3. A method of a User Equipment (UE), the method comprising:
pre-configuring first network slice information comprising an identification (ID) of a network slice associated with at least one service that the UE uses, wherein the first network slice information is stored in the UE;
receiving broadcast information related to second network slice information from a Radio Access Network (RAN);
determining third network slice information based on the first network slice information; and
sending, to the RAN, the third network slice information to execute connection processing based on the third network slice information.

4. The method of claim 3, wherein the broadcast information is broadcasted using a Broadcast Control Channel (BCCH).

5. The UE of claim 1, wherein the second network slice information indicates resource.

6. The method of claim 3, wherein the second network slice information indicates resource.

* * * * *